United States Patent [19]
Bolnick et al.

[11] Patent Number: 5,838,317
[45] Date of Patent: Nov. 17, 1998

[54] METHOD AND APPARATUS FOR ARRANGING DISPLAYED GRAPHICAL REPRESENTATIONS ON A COMPUTER INTERFACE

[75] Inventors: David A. Bolnick; Hugh V. Rubin; Mark A. Malamud, all of Seattle, Wash.

[73] Assignee: Microsoft Corporation, Redmond, Wash.

[21] Appl. No.: 497,405

[22] Filed: Jun. 30, 1995

[51] Int. Cl.[6] .................................................. G06F 15/00
[52] U.S. Cl. .......................... 345/339; 345/340; 345/343; 345/348; 345/352; 707/7
[58] Field of Search ..................... 395/326, 330, 395/331, 332, 339, 340, 348, 349, 350, 351, 342, 343; 345/326, 327, 332, 339, 340, 342, 343, 348, 349, 352, 353, 354; 707/1–5, 7

[56] References Cited

U.S. PATENT DOCUMENTS 5,680,563 10/1997 Edelman ................................ 345/348

*Primary Examiner*—Ba Huynh
*Attorney, Agent, or Firm*—Christensen O'Connor Johnson & Kindness PLLC

[57] ABSTRACT

A display arrangement system and method are disclosed for arranging repositionable graphical representations corresponding to a set of computer resources. The display arrangement system includes a layout that specifies a criterion for arranging the repositionable graphical representations. The criterion specifies at least one arrangement rule based upon the content of the computer resources. The display arrangement system also includes a graphical display arrange processor that arranges the repositionable graphical representations by applying the criterion to their corresponding computer resources. The display system may be organized as one or more frames. Each frame designates a perimeter on the graphical user interface. Each frame also includes at least one filter property value for limiting the association of individual ones of the set of computer resources with the frame. An example of a particular filter value for a frame is a filter designating only "document" type computer resources will be associated with a particular frame. The display arrange processor applies the frame filter to the computer resources in order to determine whether corresponding repositionable graphical representations will be displayed within the perimeter on the graphical user interface designated by the frame.

49 Claims, 17 Drawing Sheets

ICON FRAME AND MINIMIZED WINDOW FRAME

| Type | — 74 |
| Class | — 76 |
| Category | — 78 |
| Name | — 80 |
| Find | — 82 |

STANDARD & FULL QUERY PROPERTIES

FIG. 3

| Group By | — 86 |
| Sort By | — 88 |
| Order | — 90 |
| Snap To Grid | — 92 |

SORTING PROPERTIES

FIG. 4

| Position Left | — 96 |
| Position Top | — 98 |
| Cell Width | — 100 |
| Cell Height | — 102 |
| Frame Rows | — 104 |
| Frame Columns | — 106 |

SIZE & POSITION PROPERTIES

FIG. 5

FILL BEHAVIOR PROPERTIES

AUTO BEHAVIOR PROPERTIES

WINDOW FRAME

| Layout Name | — 140 |
| --- | --- |
| Type ("Layout") | — 142 |
| Location | — 144 |
| Last Modified | — 146 |
| Created | — 148 |
| Comments | — 150 |
| Disable Animation | — 152 |
| Index | — 154 |
| When Activated | — 156 |
| Link to Window Frame | — 158 |
| Link to Desktop Frame | — 160 |
| Link to Icon Frames | — 162 |
| Link To Minimized Window Frames | — 164 |

LAYOUT FIELDS

| Name | — 170 |
| --- | --- |
| Class Identification | — 172 |
| Type Identification | — 174 |
| Label | — 176 |
| ArrangeFrame | — 178 |

DISPLAY ARRANGE FIELDS FOR A
REPOSITIONABLE DESKTOP ITEM

METHOD AND APPARATUS FOR ARRANGING DISPLAYED GRAPHICAL REPRESENTATIONS ON A COMPUTER INTERFACE

FIELD OF THE INVENTION

This invention relates generally to the field of user interfaces for computer systems, and more particularly to graphical user interfaces wherein a user selects from a collection of graphical representations displayed upon a display screen and corresponding to computer resources.

BACKGROUND OF THE INVENTION

Today, a substantial segment of the public accomplishes a significant portion of their daily and weekly activities on a computer system. Furthermore, due to the wide variety of computer software available today, in many instances computer users accomplish all of the diverse tasks on a single, stand-alone or networked, personal computer. These tasks include, for example, accounting, wordprocessing, note taking, calendar keeping, inter-office message communication, etc. Performance of these tasks is facilitated by wordprocessing, spreadsheet, database search, and email, etc. applications programs. It is desirable for these applications to be easily accessed by the user and displayed upon the graphical user interface (GUI) in a manner such that a user can easily locate an application program and related files for purposes of performing a task.

Enhancements to, and standardization of, the interface between operating systems and applications programs have facilitated supporting a wide variety of applications on a single, universal GUI platform. One particular GUI, referred to herein as a "desktop", incorporates a desktop motif into a user interface. The desktop interface displays a variety of graphic representations corresponding to a diverse set of computer resources relating to the tasks performed by a user and the tools for accomplishing the tasks.

The desktop interface displays graphic representations corresponding to computer resources (e.g., files, folders, application programs) accessed by a user via a user controlled selection device such as a mouse, light pen or keyboard. A user need not be constantly burdened with remembering the location of an application, document or file within a computer system directory hierarchy since the most often used computer resources, or groups of resources, are displayed on the desktop GUI.

Like a physical office desktop, the most often used resources in a desktop GUI may be placed by a user in the most easily accessed locations. Like a physical office desktop wherein files, folders, books and papers are rearranged during the course of a day, the graphical representations on the desktop interface are moved by a user of the computer system to other parts of a display screen during the course of a day or work session.

Unfortunately, just like an actual physical office desktop, the desktop GUI platform becomes disorganized over the course of the day as a consequence of the moving of the graphical representations. A physical desktop cannot be re-arranged in a neat manner with a snap of a finger, however, it is possible for a computer system to re-arrange graphic images on a display screen. In the past, certain GUIs have moved icons into nearest grid positions on a single frame encompassing the entire desktop in response to a user command. This known arrangement system was based entirely upon current positions of the graphic images on the display screen.

SUMMARY OF THE INVENTION

It is a general object of the present invention to provide a mechanism for a user to easily maintain an orderly GUI.

It is yet another general object of the present invention to provide a mechanism for executing meaningful cleanup of a display screen containing graphic representations corresponding to a heterogenous set of computer resources.

It is another object of the present invention to enhance the variety of rules which are applied by a display arrangement system to a set of graphical representations on a GUI.

It is a further object of the present invention to arrange a set of displayed graphical representations on a GUI by placing the graphical representations within regions on the GUI in accordance with a set of filter characteristics associated with the regions.

It is a more specific object of the present invention to enable a user to define the plurality of regions and the set of filter characteristics in at least a portion of the regions.

It is yet another object of the present invention to provide an ordering criterion for arranging graphical representations within the plurality of regions, and an even more particular object to enable the ordering criterion to be defined by a user.

It is another object of the present invention to provide a mechanism for arranging graphical user interface boxes, corresponding to activated computer resources, displayed on a user interface in a manner decreasing the probability that a graphical user interface box will be completely obscured by another graphical user interface box.

These as well as other objects are fulfilled in a display arrangement system and method including an arrangement criterion specifying one or more rules for arranging repositionable graphical representations displayed upon a display screen corresponding to computer resources based upon the content of the computer resources. The display arrangement system also includes a graphical display arrangement processor that arranges the repositionable graphical representations by applying an arrangement criterion to the content of corresponding computer resources.

In accordance with an embodiment of the present invention, the display arrangement system comprises a layout including one or more frames. Each frame designates a perimeter defining a set of boundaries upon the GUI. Each frame also includes a filter property that limits the association of computer resources with the frame. An example of a particular filter property for a frame is a filter designating only "document" type computer resources will be associated with a particular frame.

The display arrangement system also includes a graphical display arrange processor. The graphical display arrange processor reads the filter property and applies the value to the set of computer resources. After applying the value, the graphical display arrange processor assigns locations within the perimeter to the graphical representations associated with the computer resources meeting the at least one filter property value. In accordance with the above example, the graphical representations associated with "document" type computer resources are assigned locations within the perimeter by the display arrange processor.

A feature associated with an illustrative embodiment of the present invention comprises providing a plurality of levels of specificity for filters. The specificity of the filters ranges from the least specific generic computer resource types (e.g. documents, files, folders, scraps, email) to the most specific filters designating a logical search based upon designated character strings which are matched against the contents of computer resources containing text data.

Another feature of the illustrative embodiment of the present invention is the capability of a frame to designate an order in which the graphical representations meeting the frame's filter(s) are arranged within the frame's perimeter. More particularly, similar computer resources are grouped together when more than one type of computer resource is associated with a frame. The graphical representations are arranged in a logical progression such as alphabetical order in order to facilitate locating a computer resource in a highly populated frame.

The illustrative embodiment of the present invention includes a layout editor that enables a user to create and edit layouts and define new frames, frame sizes, frame filters, and arrangement criteria for graphical representations associated with the frames.

The illustrative example of the present invention possesses the ability to adjust the position of the frames in a layout in response to a change in the dimensions of a work area with which the layout is associated. Furthermore, the rows and columns of the icon frames of a layout are recalculated when a user selects a small icon view (thereby changing the size of an icon cell).

The illustrated display arrangement system embodying the present invention also includes a capability to determine the area on a display interface occupied by each active GUI box. The display arrange system stacks the active GUI boxes on the display screen from an active GUI box requesting the greatest area (on the bottom) to the active GUI box requesting the least are on the display screen.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIG. 3 is a schematic drawing of the sub-fields for the Frame Filter Properties field within icon and minimized window frames;

FIG. 4 is a schematic drawing of the sub-fields for the Sort Properties field within icon and minimized window frames;

FIG. 5 is a schematic drawing of the sub-fields for the Size and Position Properties field within icon and minimized window frames;

DETAILED DESCRIPTION OF ILLUSTRATED EMBODIMENTS

I. An Illustrative Graphical User Interface For A Layout Editor

Figure 1:
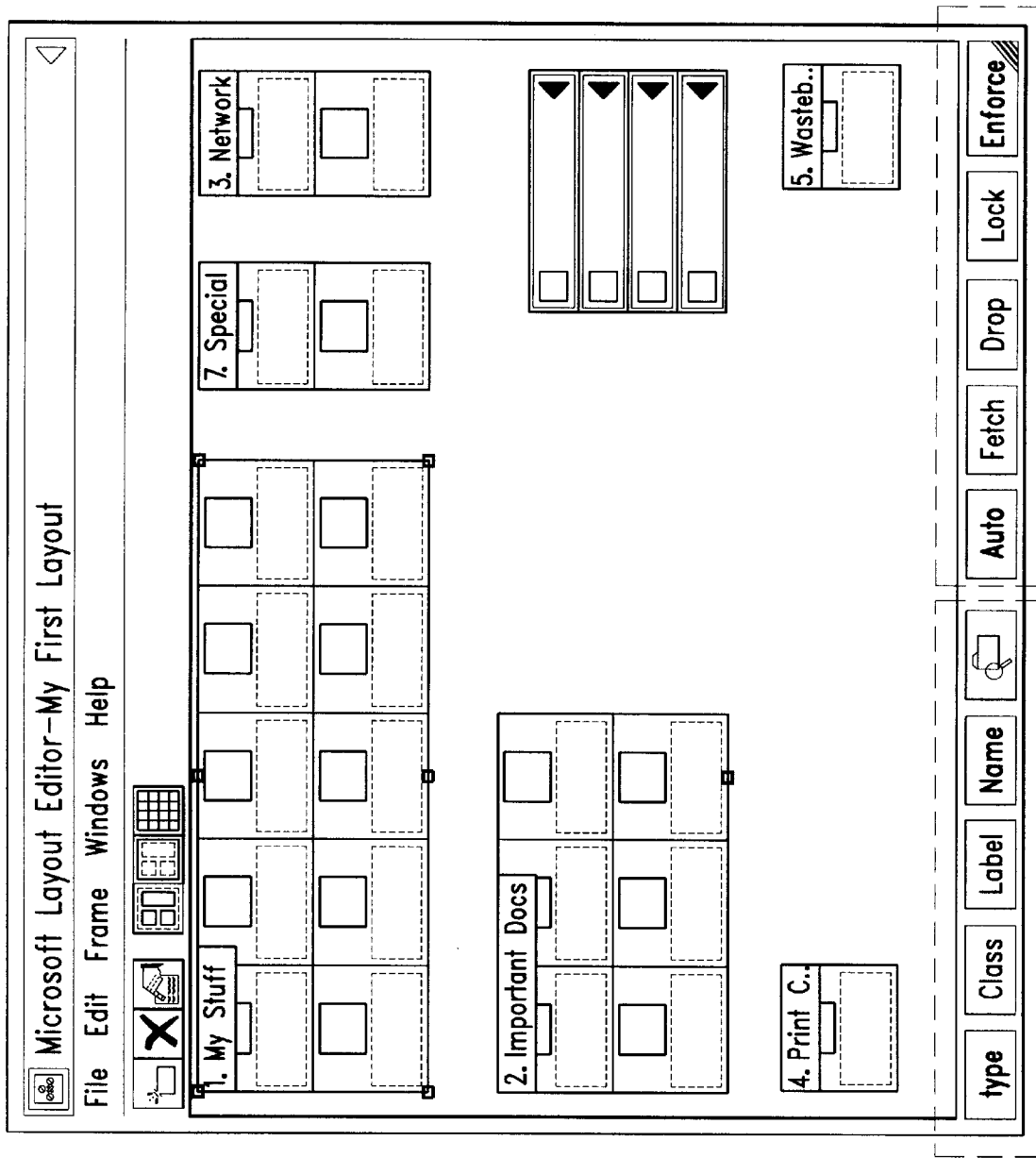
FIG. 1 is a drawing illustrating a display screen for a Layout Editor window containing an exemplary layout having icon frames and a minimized window frame.

Turning to FIG. 1, an illustrative depiction is provided of a display screen for a Layout Editor interface for the display arrangement system of the present invention. A title bar 20 is positioned at the top of the display screen and identifies the "Microsoft Layout Editor" window, and the presently loaded layout named "My First Layout". Also included is a Command Bar (not shown) including the well-known Maximize, Minimize and Close options. In the illustrated embodiment, the Command Bar (not shown) replaces a slideout command icon 22 and extends from the upper right corner of the Layout Editor screen when a user selects the slideout command icon 22. Selection of the slideout command icon 22 is accomplished by moving a mouse pointer proximate the slideout command icon 22. Also included in the title bar 20 is a known open window mini icon 24 for the Microsoft Layout Editor window.

Positioned below the title bar 20 is a menu bar 26. The menu bar 26 includes a number of expandable menus including: File, Edit, Frame, Windows, and Help expandable menus. The contents of these expandable menus will be discussed in further detail below. Positioned below the menu bar 26 is a tool bar 28 providing direct access to certain Layout Editor operations. As is known in the art, the tool bar elements facilitate the selection of an operation represented by a tool bar element without accessing a menu (on the menu bar) on which the operation is displayed. A New Frame Icon 30 enables a user to request the Layout Editor to create a new frame for a current layout. A Delete Frame Icon 32 enables a user to request the Layout Editor to delete a selected frame from a currently loaded layout. The Delete Frame Icon 32 is disabled if no frame is selected. When a user selects a Frame Properties Icon 34 the Layout Editor launches a properties dialogue for a selected frame enabling a user to review and modify the property fields of a selected frame in a layout (discussed in detail below).

The tool bar 28 also displays three additional icons facilitating quick selection of one of three frame type layers for review and editing by the user. When a user selects an Icon Layer Icon 36 the Layout Editor displays icon and minimized window frames for a layout. Next, when a Window Frame Layer Icon 38 is selected, the Layout Editor displays a window frame for a selected layout and provides access to a set of commands for editing the window frame.

A Desktop frame is a generic frame that fills the entire Desktop. If an object fails to belong to user defined frames, it will be picked up by the Desktop frame during Global Cleanup operation (described below) where all of the graphical representations of the GUI are rearranged. A Desktop Layer Icon 40 enables a user to review and edit the Desktop frame layer for a selected layout.

A status bar 42 for a selected icon frame 44 is provided at the bottom of the layout display shown in FIG. 1. The status bar 42 includes a number of entries indicating which ones of a set of filter properties and automatic behaviors have been activated for the selected icon frame 44. In accordance with the illustrated embodiment of the present invention, entries having black typeface represent active filter properties or automatic behaviors, while a grayed entry on the status bar implies that the filter property or automatic behavior has been disabled or set to null.

The entries of the status bar 42 fall within two identifiable groups. A filter group 46 comprises entries including Type, Class, Label, Name, and Explorer (Find) relating to the filter properties of the selected frame. An automatic behaviors group 48 comprises entries including Auto (Auto-Arrange), Fetch (Auto-Fetch), Drop (Drop Fill Only), Lock (Lock Frame After Arrange), and Enforce (Enforce Frame) indicating the status (active/disabled) of the automatic behaviors for the selected icon frame 44. Each of the entries of the status bar 42 is discussed in detail below in a description of the fields of a frame.

A main display portion 43 of the Layout Editor displays the presently loaded layout. The background of the selected icon frame 44, entitled "My Stuff", is highlighted (all white) in order to indicate to a user that the "My Stuff" icon frame 44 has been designated for review and editing of property fields through the Layout Editor.

The Layout Editor also provides a central grab bar 45 on the selected frame 44 enabling a user to move the selected frame 44 by moving a mouse controlled pointer over the central grab bar 45, clicking down on a mouse button, dragging the central grab bar (and an outline image of the selected frame 44) to a new position, and releasing the mouse button. The Layout Editor facilitates re-sizing the frame in either one direction or two dimensions depending upon the location of a grab bar $b_i$ selected by a user. If a user selects a grab bar $b_i$ disposed on a side of a frame (e.g., grab bar $b_1$ or $b_2$), then Layout Editor allows re-sizing in only one dimension (rows or columns, but not both). However, if the user selects a corner positioned grab bar (e.g., grab bar $b_3$), then the Layout Editor supports re-sizing in two dimensions (rows and columns).

All of the frames in FIG. 1, except for a "Min. Window" frame 58 (a minimized window frame), are icon frames. In addition to the selected icon frame 44 named "My Stuff", the displayed layout includes a number of additional frames including: an Important Docs frame 50, a Network frame 52, a Print C frame 54, a Wastebasket frame 56, the Min. Windows frame 58, and a Special frame 60. The icon frames displayed in FIG. 1 are created by means of layout editing tools provided by the Layout Editor. The layout editing tools are described further below.

The portion of the GUI available for displaying open applications is referred to as a Desktop. The size of the Desktop in some cases is limited by tool bars, menu bars, and other persistent GUI features. The area defined for the Desktop represents the limit for maximizing an open window. In accordance with the illustrated embodiment of the present invention, the positions of frames associated with a current layout are adjusted in response to re-sizing of the Desktop. This aspect of the illustrated embodiment of the invention is described further below.

II. Defining The Frame And Layout Structures

A. The Frame Structures

Graphical representations are arranged on the Desktop within virtual perimeters referred to as "frames." A frame is a defined boundary or perimeter on a GUI within which the display arrange system places graphical representations for computer resources meeting a set of filter properties specified for the frame. The area within the boundaries of a frame is composed of cells. The associated set of properties for a frame define the frame's location, dimensions, acceptable contents, order of filling, and manner of arranging the contents of the frame within the cells of the frame.

The illustrated embodiment of the display arrangement system comprises four (4) types of frames: icon, minimized window, Desktop, and Window. Each type of frame (described below) fulfills a particular function in the display arrange system of the present invention. The above list of frame types is not intended to be exhaustive. Rather, other arrangement frame types will be known to those skilled in the art in view of the illustrated examples.

1. Icon And Minimized Window Frame Structures

Icon frames (e.g., "My Stuff" icon frame 44) and minimized window frames (e.g., "Min. Windows" frame 58) are substantially similar. The only significant differences between icon frames and minimized windows are their contents (icons/minimized windows) and default cell sizes. As should be apparent from the frame names, Icon frames accept only icons and minimized window frames accept only minimized windows when an arrange function is applied to the frames. Since the typical size of an icon graphical representation and a minimized window graphical representation are different, a default cell size for an icon frame differs from a default cell size for a minimized window frame in order to accommodate the difference in the typical size of these two types of graphical representations.

Figure 2:
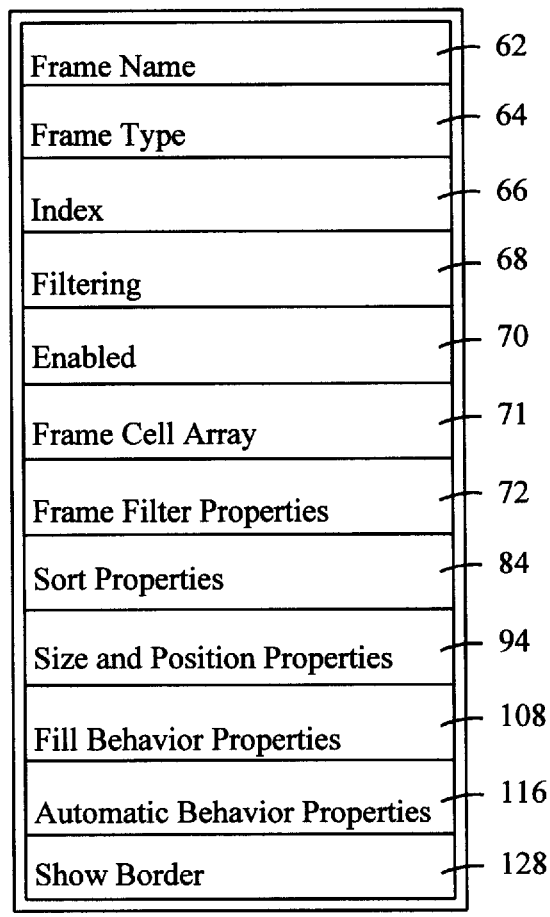
FIG. 2 is a schematic drawing of a set of property fields included within icon and minimized window frames.

The property fields for icon and minimized window frames are schematically depicted in FIG. 2. Each property field is initially loaded with a default value when a new frame is first created by the Layout Editor. A user thereafter modifies the fields associated with a frame via frame editing commands (described below) provided by the Layout Editor.

A Frame Name field 62 comprises a character string used to identify a selected frame. The display arrange system supplies a default character string "Frame<index>" which identifies a frame by its index value. The index value is also utilized to establish a relative priority of a frame in comparison to other frames in a layout.

A Frame Type field 64 indicates whether the frame is an icon frame, minimized window frame, window frame, or Desktop frame. The default value for the Frame Type field 64 designates the frame as an icon frame. In the illustrated embodiment of the present invention, each layout includes only one window frame and one Desktop frame. The window frame and Desktop frame are supplied in a default layout supplied by the Layout Editor when a new layout is created. Therefore, when additional frames are added to a layout, the user may only re-designate the added frames (initially specified as icon frames) as minimized window frames.

During ranking of frames for purposes filling with appropriate icons, the frames are first generally ordered into frames having an activated auto-fetch automatic behavior, and those which do not. As will be further explained below, auto-fetch frames automatically pull appropriate desktop items within their borders. During ranking of frames, all frames having an activated auto-fetch behavior are ranked above non-auto-fetch frames.

As will be explained in greater detail below, the priority of frames within each of the two groups of frames having a same auto-fetch automatic behavior is determined primarily by the specificity of the frames' filters. A frame having a more specific frame filter is assigned a relatively higher priority in comparison to a frame having a less specific filter. This ensures that a graphic representation for a computer resource meeting the frame filters for a plurality of frames having a same auto-fetch automatic behavior will be placed within a frame having a most specific filter. In cases where two or more frames have a same filter specificity, relative priority among the frames is established by comparing numerical values stored in an Index field 66 of each frame.

In a layout having n frames before the new frame was created (not including the Window frame or Desktop frame), the frame is initially assigned the numerical value "n+1". However, in an embodiment of the present invention, the index value automatically assigned to a frame may be overridden by a user by explicit designation of an index value for the frame.

A Filtering field 68, controlled by a user, indicates whether standard query, full query or no filtering is applied during the arrangement of objects displayed upon the Desktop. The default entry in the Filtering field 68 indicates no filtering. Both standard query and full query operations are described below.

An Enabled field 70 indicates whether the frame has been enabled for application to the graphical representations displayed upon the desktop when an arrange function is invoked. If a frame is not enabled, then the frame is treated as though it does not exist and will not have any effect upon frames having overlapping cells. The default entry for the Enabled field 70 is TRUE. The TRUE setting indicates that the frame will participate in arrange operations described below.

An icon or minimized window frame also includes a Frame Cell Array 71. The Frame Cell Array 71 is a two dimensional array corresponding to the cells of a frame. Each array entry of the two dimensional array indicates whether a corresponding cell is available, filled, or unavailable (due to overlap with a higher priority frame cell).

Each icon or minimized window frame includes a set of Frame Filter Properties 72. The Frame Filter Properties 72 for a frame limit the icons or minimized window graphical representations which may fill the frame when an arrange operation is executed by the display arrange system. The default selection for each filter property of the set of Frame Filter Properties 72 is a null selection. A null selection for a filter property indicates that no filtering will be applied with respect to a filter property. The filter properties comprising the set of Frame Filter Properties 72 are described below in conjunction with a description of FIG. 3. In accordance with the illustrated example of the present invention, the filter properties, when specified, limit the computer resources which may associate with a frame when the moveable graphical representations corresponding to the computer resources are automatically arranged on the GUI.

Turning to FIG. 3, the set of Frame Filter Properties 72 for a frame includes a Type field 74. The Type field 74 comprises a list of generic types including: application, document, folder, scrap, system, wastebasket, printer, mail, local drive, and/or volume. The list of generic types is not exhaustive, and other generic types will be known by those of ordinary skill in the art. The Type field 74 includes a sub-field for each listed generic type indicating whether a user has selected the corresponding generic type. When specifying filter properties for a frame, a user may select one or more of the listed generic types. If the user specifies more than one of the generic types in the Type field 74, then a computer resource will meet the Type field 74 filtering if it falls within one (or more) of the generic types specified in the Type field 74 for the frame.

The set of Frame Filter Properties 72 also includes a Class field 76. The Class field 76 comprises an extensible list of registered classes of computer resources. A registered class comprises a group of executable and/or non-executable objects which are logically associated by means of a common application category. Examples of registered classes are a WinWord Word Document class including all objects associated with the class or an Excel Spreadsheet class including all objects associated with the class. The Class field 76 includes a sub-field for each listed registered class indicating whether a user has selected the corresponding registered class. When specifying filter properties for a frame, a user may select one or more of the listed registered classes. If the user specifies more than one of the listed registered classes in the Class field 76, then a computer resource will meet the Class field 76 filtering if it falls within one (or more) of the registered classes specified in the Class field 76 for the frame.

A Category field 78 enables a user to specify a label filter property for a frame. If a user specifies a label filter in the Category field for a frame, then association of computer resources with the frame will be limited to the computer resources having graphical representations on the display screen having the specified label. Examples of possible labels include, for example, a "litigation" label or a "patent" label attached to a document. The Category field 78 supports the designation of more than one label. When more than one label is specified for a frame, an object need only match one of the designated labels in order to meet the label filtering for the frame.

A Name field 80 enables a user to specify a character string. When filtering is performed on a frame specifying a character string in the Name field 80, the character string is compared to file names for computer resources having moveable graphical representations on the display screen. Association of computer resources with the frame is limited to computer resources containing the specified character string in the computer resources' file names. For example, the user may designate a frame for holding all files for a project identified by file names including the character string "PROJECTX." The Name field 80 supports the designation of more than one character string. When more than one character string is specified for a frame, a file need only match one of the specified character strings in order meet the name filtering for the frame. The Type field 74, Class field 76, Category field 78, and Name field 80 are consulted by the display arrange system when standard query filtering is designated in the Filtering field 68.

A Find field 82 enables a user to specify full query filter criterion including a character string or strings as well as logical connectors such as "and", "or", and "not". If a character string or strings are specified in the Find field 82 and full query searching is designated in the Filtering field 68 for a frame, then the character string(s) in the Find field 82 is (are) compared (in accordance with the full query filter criterion) to the full text of files having moveable graphical representations on the display screen. Association of a file having a moveable graphical representation on the display screen with the frame is based upon a match between the text within a file and the logical text search specified by the full query filter criterion in the Find field 82.

It has been previously stated that priority is assigned to frames based upon the specified filtering. Frames which specify full query filtering are assigned a higher priority than all frames (having a same auto-fetch automatic behavior (described below)) where full query filtering is not specified. This ensures that frames designating full query filtering are considered first when a display interface is automatically arranged in accordance with a Global Cleanup operation described below.

Returning to FIG. 2, each icon or minimized window frame also includes a set of Sort Properties 84. The Sort Properties 84 define a criterion for ordering icons or minimized windows within a frame when an arrange function is invoked upon the display arrange system. The default setting for each sort property of the set of Sort Properties 84 is FALSE. The FALSE setting indicates that a particular sort property will not be applied to objects within the frame. Specific sorting property fields are described below in conjunction with a description of FIG. 4.

Turning to FIG. 4, the sub-fields of the Sort Properties 84 for a frame are summarized. A Group By field 86 specifies whether graphical representations associated with a frame will be grouped with other graphical representations within the frame according to either Type or Class (designated in the Frame Filter Properties 72 described above) or whether no grouping of the graphical representations will occur. The grouping feature provides an advantage in frames specifying a plurality of Types or Classes in the Type field 74 or Class field 76 so that graphical representations meeting the various designated Types or Classes can be displayed together. If no Type or Class filters are designated in the Frame Filter Properties field 72, then no grouping will occur. An example of grouping by Type is the grouping of documents in a first group and scraps within a second group within a heterogenous (i.e., more than one Type) frame.

A Sort By field 88 specifies whether graphical representations associated with a frame will be arranged within the frame in accordance with a designated sorting method from a set of sorting methods. The set of sorting methods includes: File Name (alphabetical order), Date/Time, Type (arranged alphabetically within groups of graphical representations of a same type), Size, Position, or No Sorting.

The Size sorting method orders the icons or minimized windows in accordance with the amount of memory occupied by the associated file. When sorting by Position is selected, ordering of icons within a frame is based upon either absolute proximity where a nearest unassigned icon to a cell claims the cell, or relative proximity where the icons are shifted so that an icon can take a cell while maintaining the relative positioning of the icons within their rows and columns. During a Global Cleanup (described below) absolute positioning is utilized. When a single icon is dropped into an acceptable frame, relative proximity is used. Relative proximity arrangement enables a user to insert an icon between two previously placed icons.

An Order field 90 specifies whether a sorting method designated in the Sort By field 88 will be applied to sort the icons or minimized windows in ascending or descending order. When both grouping and sorting properties are specified for a frame, the objects for a frame are first grouped, then sorting is applied within the groups as a secondary ordering key.

A Snap to Grid field 92 specifies either a TRUE or FALSE value. When set to TRUE, the positions of the moveable graphical representations associated with a frame are automatically adjusted to fill a nearest open frame cell. When a new graphical representation is added to the frame, the graphical representation is placed in the nearest open frame cell. When the Snap to Grid field 92 registers TRUE, the grouping and sorting operations are disabled regardless of the state of the Group By field 86 and the Sort By field 88. The default setting for the Snap to Grid field 216 is FALSE.

Returning briefly to FIG. 2, each icon or minimized window frame includes Size and Position Properties 94. The Size and Position Properties 94 define the position of a frame, the size of cells within the frame, and the frame size (in terms of the number of columns and rows of cells). A set of fields within the Size and Position Properties 94 are described below in conjunction with a description of FIG. 5.

Turning to FIG. 5, the Size and Position Properties 94 include a Position Left field 96. The Position Left field 96 designates the distance of the frame's left border from the left boundary of the Desktop. A Position Top field 98 designates the distance of the frame's top border from the top boundary of the desktop. An example of default entries for the above position variables for a frame correspond to a centering of the frame on the Desktop.

A Cell Width field 100 and a Cell Height field 102 designate the width and height respectively of each cell within the frame. An example of a default size for a cell within an icon frame is 1000 twips high by 1400 twips wide. However, the selection of a default cell size may be modified in accordance with the size of the typical icons or other graphical representations which will populate a given type of frame. Thus, a default cell size for a minimized window frame should be selected in accordance with the typical width and height of graphical representations for minimized windows.

A Frame Rows field 104 and a Frame Columns field 106 designate the number of rows and columns of cells respectively within the frame. An example of a default size for a frame is two rows by two columns of cells. However, other default sizes will be contemplated by those skilled in the art.

Returning to FIG. 2, each icon frame or minimized window frame includes a set of Fill Behavior Properties 108. The Fill Behavior Properties 108 specify the order in which the rows and columns of cells of a frame are filled by icons or minimized windows. Specific fill property fields are described below in conjunction with a description of FIG. 6.

Figure 6:
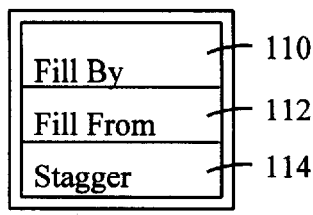
FIG. 6 is a schematic drawing of the sub-fields for the Fill Behavior field within icon and minimized window frames.

Turning to FIG. 6, a Fill By field 110 designates whether filling of the frame will be by row, by column, or automatic. When a frame is filled by row, all cells for all columns in a row are filled in a row before advancing to a next row of cells in the frame. If filling by column is specified, then all cells for all rows in a column are filled before advancing to a next column of cells in the frame. When the automatic setting is selected, the cells of the frame are filled by row if the number of columns in the frame is greater than or equal to the number of rows. Otherwise, the cells are filled by column.

A Fill From field 112 designates whether a selected frame will be filled from left to right, from right to left or automatic. When the automatic setting is selected, the cells of the frame are filled from left to right if the number of columns of the frame on the left portion of the Desktop is greater than or equal to the number of columns on the right portion of the Desktop. Otherwise, the cells are filled from right to left.

The Fill From field 112 also designates whether filling is to be from top to bottom, bottom to top, or automatic. When the automatic setting is selected, the cells of the frame are filled from top to bottom if the number of rows of the frame on the upper portion of the Desktop is greater than or equal to the number of columns on the lower portion of the Desktop. Otherwise, the cells are filled from bottom to top.

The default setting for each of the above fill behaviors designated by the Fill By field 110 and the Fill From field 112 is the automatic setting. Also, when the Snap to Grid field 92 is set to TRUE, the fill behaviors designated in the Fill By field 110 and the Fill From field 112 are disabled.

The Fill Behavior Properties 108 also includes a Stagger field 114. The Stagger field 114 specifies whether icons or minimized windows will be placed into every other cell within a frame in a "checkerboard" manner.

Returning to FIG. 2, in the illustrated embodiment of the present invention, each icon or minimized window frame includes a set of Automatic Behavior Properties 116 comprising five sub-fields. The five sub-fields, described below in conjunction with the description of FIG. 7, correspond to five different types of automatic frame behaviors the display arrange system is capable of exhibiting when a graphical representation corresponding to a computer resource is dragged and dropped on the Desktop. In the illustrated embodiment of the invention, each sub-field comprises a status register which indicates whether the corresponding automatic behavior is activated. The default setting for each of the five automatic behaviors is FALSE (disabled).

Figure 7:
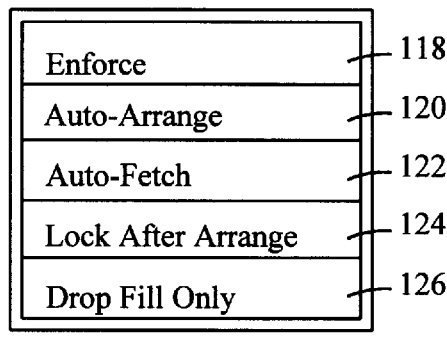
FIG. 7 is a schematic drawing of the sub-fields for the Automatic Behavior field within icon and minimized window frames.

Turning to FIG. 7, the sub-fields of the Automatic Behavior Properties 116 include an Enforce field 118. The Enforce field specifies whether the display arrange system will automatically apply the Frame Filter Properties 72 for a frame to any graphical representation which a user attempts to drop within the frame's defined perimeter. When the Enforce automatic behavior is activated, the display arrange system will not permit a repositionable graphical representation for a computer resource to be positioned within the perimeter of the frame unless the computer resource meets the filter parameters specified by the frame.

Furthermore, when the Enforce automatic behavior is activated, a "Show Border" property (discussed below) is set for a frame, an XOR (contrasting) border can be displayed around the perimeter of the frame whenever a moveable graphical representation is dragged over the frame's boundary in order to provide visual feedback to a user that the graphical representation has entered an enforced frame area.

The Enforce automatic behavior is disabled in a frame when the Filtering field 68 for the frame specifies full query filtering. Disabling the Enforce automatic behavior in such a frame avoids the substantial delays incurred in searching an object for a string of characters designated in the Find field 82 of the frame.

It should be noted that frame perimeters can overlap. When a user drops a moveable graphical representation into a region covered by two frames with activated Enforce behavior, the filter properties of the frame having the higher priority determines whether the graphical representation may reside within the overlapping frame region. This particular aspect of the Enforce automatic behavior is useful for preventing important GUI objects such as drives and wastebaskets (having activated auto-fetch behavior and very specific frame filters) from being obscured by other moveable graphical representations.

An Auto-Arrange field 120 specifies whether the display arrange system will automatically re-arrange the icons or minimized windows within a frame (an arrange operation referred to as "local tidying") whenever a moveable graphical representation corresponding to a computer resource meeting the filtering criterion of the frame is dropped within the perimeter of the frame. If a moveable graphical representation which does not meet the filtering criterion of the frame is dropped within the perimeter of the frame, then local tidying is not invoked. The Auto-Arrange field 120 is automatically set whenever the Enforce field 250 is set for a frame, and disabled when full query filtering is specified in the Filtering field 68 of a frame.

An Auto-Fetch field 122 specifies whether the display arrange system will automatically place a displayed moveable graphical representation corresponding to a computer resource meeting the filter criterion for a frame within the border of the selected frame assuming all other conditions are met (i.e., empty cells exist, the frame has precedence over other frames having acceptable filter properties, etc.). When an object is dropped by a user onto the Desktop, precedence is first given to a frame that receives the drop, then from lowest to highest index value in all frames in which the Auto-Fetch field 122 has been set. The Auto-Arrange field 120 is automatically set for a frame when the Auto-Fetch field 254 is set for the frame. Therefore, local tidying is invoked whenever a new icon or minimized window is added to a frame via the auto-fetch automatic behavior for the frame. The Auto-Fetch automatic behavior is disabled in all frames where the Filtering field 68 specifies full query filtering.

A Lock After Arrange field 124 specifies whether the items contained within a frame will be automatically locked into position (and cannot be dragged) after the items have been arranged. This is particularly useful for objects such as drives and wastebaskets which users typically wish to remain in one area of the Desktop. If the Lock After Arrange field 124 is set for a frame, then the Auto-Arrange field 120 is automatically set for the frame.

A Drop Fill Only field 126 specifies whether items will be added to, or removed from, the frame only through a user invoked drag/drop operation. When the Drop Fill Only field 126 is set in a frame, the frame and its present contents will not be available for a Global Cleanup operation on the Desktop. A frame demonstrating the automatic behavior associated with a set Drop Fill Only field 126 is particularly well suited for use as a noteboard. In order to ensure proper operation of the "drop fill only" automatic behavior, the Auto-Fetch field 122 and Lock After Arrange field 124 are reset to FALSE in order to disable those two automatic behaviors for the frame when the Drop Fill Only field 126 is set. In addition, the Snap to Grid field 92 is set to TRUE in response to the setting of the Drop Fill Only field 126. The Drop Fill Only field 126 is disabled in a frame when full query filtering is specified by the Filtering field 68 for the frame.

Returning again to FIG. 2, each icon or minimized window frame includes a Show Border field 128. When the Show Border field 128 is set to TRUE, a border graphically indicating the perimeter of the frame is displayed as shown in the frames displayed in FIG. 22B. The default setting for the Show Border field 81 is FALSE.

Having completed the description of FIGS. 2–7 which schematically depict the fields for specifying the behavior and appearance of the frames for icon frames and minimized window frames, it is noted that these fields comprise a portion of an illustrative example of the present invention. Modifications and alterations to the above described set of fields defining the behavior and appearance of a frame and/or layout will be known to those skilled in the art.

2. Desktop Frame Structure

Figure 8:
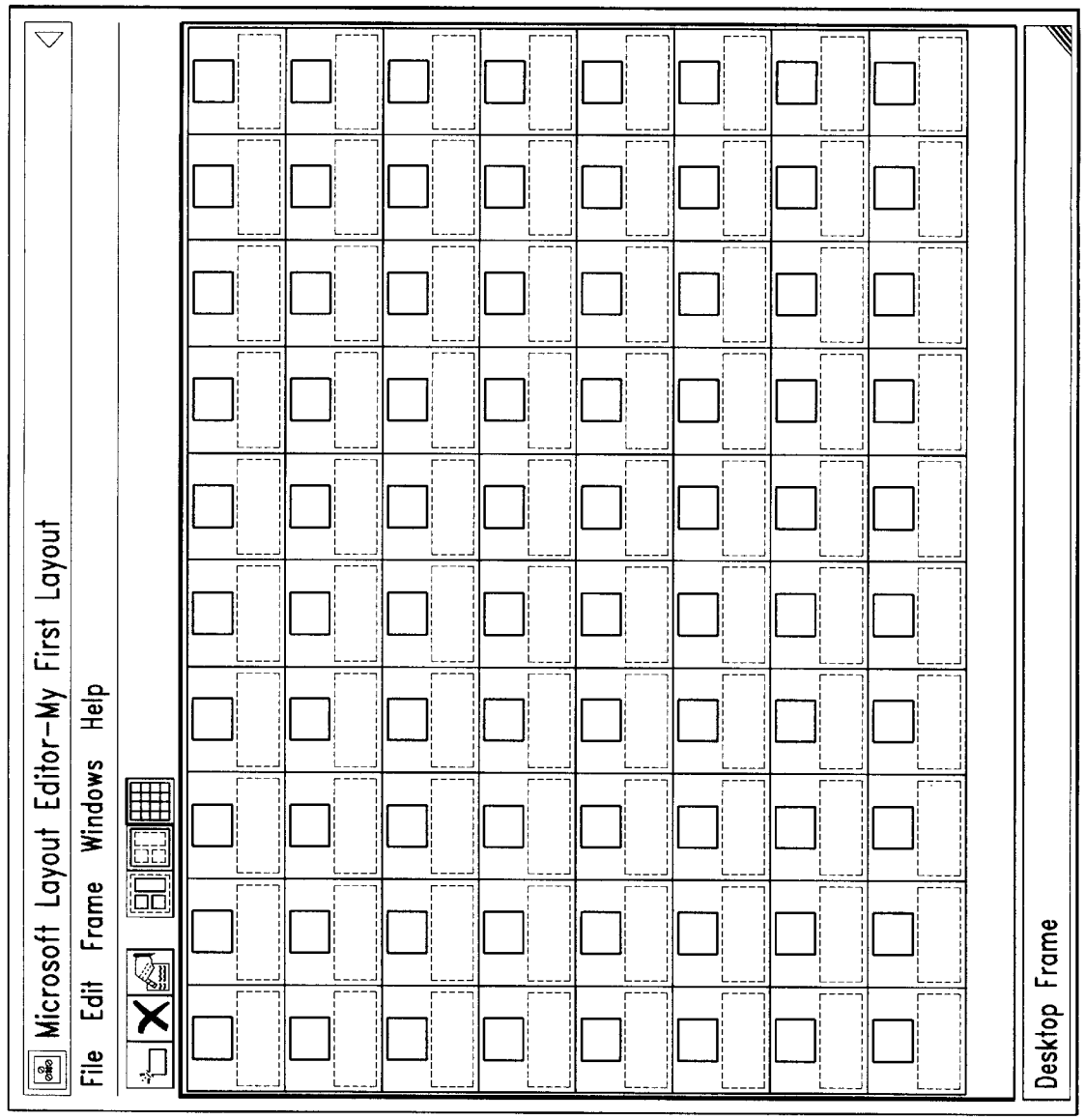
FIG. 8 is a drawing illustrating a display screen for a Layout Editor window displaying a Desktop frame.

Having described the icon and minimized window frames, a description of a Desktop frame is provided. The Desktop frame is a special icon frame. The Desktop frame, shown within a Layout Editor window in FIG. 8, fills the entire Desktop. The Desktop frame has the lowest priority in a layout and serves as a depository of icons that do not fall within any of the other defined frames of a layout. If all cells in the Desktop layout are full, then an icon will not be moved.

In contrast to the icon and minimized window frames, a user cannot specify filter, fill or automatic behaviors for the desktop frame. Therefore, the fields described above relating to these properties/behaviors in the icon and minimized window frames are disabled in the Desktop frame. The Desktop frame always occupies the entire Desktop, and therefore the size and position fields cannot be modified by a user. However, a user may specify sorting properties for a Desktop frame.

In the illustrated embodiment of the present invention, the user may specify whether or not the Snap to Grid behavior is exhibited by the Desktop frame. The Snap to Grid behavior, when enabled in the Desktop frame, causes all of the icons associated with the Desktop frame to be placed in predefined positions within closest available cells in the Desktop frame. The Desktop frame accepts and positions icons which do not meet the filter characteristics of any of the icon frames defined for a layout. In the illustrated embodiment of the present invention, the default setting to the Snap to Grid property of the Desktop frame is FALSE (i.e. disabled).

3. Window Frame Structure

A Window frame prescribes the boundaries for window maximization and for the arrangement and positioning of open windows on a GUI. The Window frame prescribes the boundaries of maximization of a window. The Window frame also provides guidelines for placement and ordering of open windows upon the display screen when the open windows are automatically arranged by the display arrange system.

Figure 9:
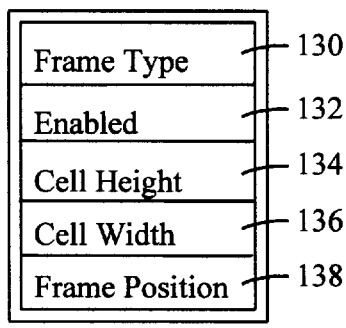
FIG. 9 is a schematic drawing of a set of property fields included within a Window frame.

Turning now to the schematic drawing in FIG. 9, the fields of the Window frame include a fixed Frame Type field 130 identifying the Window Frame. An Enabled field 132 indicates whether the Window frame has been enabled for application to the open windows displayed upon the GUI when an arrange function is invoked. The default setting for the Enabled field 132 is TRUE. When the Enabled field 132 is set to TRUE, the Window frame actively participates in the display of open windows by the GUI to limit the size and position of a maximized open window to the Window frame perimeter.

A Cell Height field 134 identifies the height of the Window frame. A Cell Width field 136 identifies the width of the Window frame. The default height and width provided in the Cell Height field 134 and Cell Width field 136 are the height and width of the Desktop. However, a user may reduce the area of the Window frame in order to accommodate the needs and preferences of the user. For users working at higher screen resolutions on larger monitors, it may be desirable to decrease the size of the Window frame so that a maximized window does not occupy the entire Desktop. This enables users to reserve a section of the Desktop for objects or applications such as a calculator without covering a maximized window.

The Window frame also includes a Frame Position field 138. The Frame Position field 138 specifies the location of the top and left corner of the Window frame on the Desktop. The default position of the Window frame is the upper, left corner of the Desktop. However, the position may be modified by the user in cases where the Window frame dimensions are smaller than the Desktop dimensions. The Window frame may be moved only to the extent that the Window frame perimeter does not extend beyond the Desktop perimeter.

B. The Layout Structure

Figures 10, 11, 12:
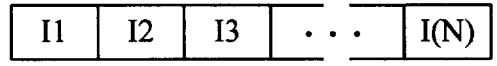
FIG. 10 is a schematic drawing of a layout object.
FIG. 11 is a schematic drawing showing an array of records corresponding to a set of repositionable icons displayed upon a graphical user interface.
FIG. 12 is a schematic drawing showing a set of information fields contained within a desktop item.

A group of associated frames are incorporated into a unit, for organizing graphic representations on a display screen, referred to as a "layout." Turning now to FIG. 10, a schematic drawing is provided showing a set of fields contained within a layout object which define the behavior of the layout. When a Global Cleanup operation is invoked by a user, the display arrange system arranges the icons, minimized windows, and open windows on the Desktop in accordance with the currently selected layout. A Layout Name field 140 comprises a character string provided by a user for identifying a particular layout. A Type field 142, automatically set by the display arrange system, identifies the object as a "Layout" object type. A Location field 144 specifies where the layout object is stored within a file structure of a computer system utilizing the display arrange system.

In order to assist a user in identifying layout objects, such as when different layout objects of a layout having a same name are stored on different volumes or directories in a computer system, each layout object includes a Last Modified field 146 and a Created field 148 providing a date and time inserted by a computer system clock at the time the Layout was last saved via the Layout Editor and the date and time in which the Layout was first generated via the Layout Editor respectively.

The layout object also includes a Comments field 150 enabling a user to enter a character string associated with the layout which, for example, contains a brief description of the layout content and behavior. While some users may enjoy watching icons move to a proper positions on a display screen when an arrange operation is executed on the moveable graphical representations, the animation feature slows down the arrange operation. Therefore, a Disable Animation field 152 provides an on/off control for a user to activate and deactivate the animation feature. When the Disable Animation field is set to FALSE (the default value), the rearranging of the icons on the display screen is shown via animation.

The layout editor assigns an index number to each new frame. As previously explained, the index number is applied in accordance with a secondary basis for establishing the frame's priority for receiving icons or minimized windows during an arrange operation. Initially, the new frame is assigned the highest index value (lowest priority) of all of the currently existing icon frames and minimized window frames. An Index field 154 of the layout object lists the current icon frames and minimized window frames according to their associated index values. The user may manipulate the priority of a frame by changing the index value associated with the frame. The index values of the other frames are changed in the Index field 154 to avoid gaps and overlaps in the index values.

During a display arrange operation on the Desktop items, frames having a same auto-fetch automatic behavior are filled with icons or minimized windows primarily based upon the specificity of their filters. This prioritization scheme is described below during the detailed description of a Global Cleanup Operation. The index values associated with frames are utilized as a secondary sort key in order to break any ties which are encountered when the display arrange system prioritizes frames based upon their specificity.

The layout object also includes a When Activated field 156 which controls the activation of two functions applied to windows present on the GUI when the layout object is applied to objects on the Desktop during an arrange operation. First, the When Activated field 156 specifies whether the display arrange system will minimize all open windows on a Desktop when the layout object is applied by the arrange system. A value of FALSE (the default setting) for this control disables the "minimize all open windows" function. Second, the When Activated field 156 also specifies whether the display arrange system will arrange the minimized windows on the Desktop when activated. A value of TRUE (the default setting) for this control causes the display arrange system to arrange the minimized windows on the desktop when the layout object is applied to objects on the Desktop during an arrange operation.

In the illustrated embodiment of the present invention, each layout object includes a Link to Window Frame 158 comprising a pointer to a Window Frame for the layout, and a Link to Desktop Frame 160 comprising a pointer to a Desktop Frame. Each layout object also includes a Link to Icon Frames 162 comprising a pointer to a set of icon frame records for the layout object, and a Link to Minimized Window Frames 164 comprising a pointer to a set of minimized window frame records.

The display arrange system supports the archiving of a plurality of defined layouts with corresponding layout objects of the type illustratively depicted in FIG. 10. The possible layout objects stored by the display arrange system include pre-stored layouts, user created stored layouts, and edited re-stored layouts. Furthermore, it will be appreciated by those of skilled in the art that other embodiments of the present invention may include layout objects comprising a different set of fields than those summarized in the illustrated embodiment of the invention.

C. The Display Arrange Related Fields Associated With Repositionable Desktop Item Turning to FIG. 11, a set of "N" computer resources corresponding to moveable graphical representations displayed upon the Desktop (referred to as icons) are organized as an array of records. Similar arrays are also maintained by the graphical user interface for minimized windows and non-minimized windows. Each record (referred to as a "Desktop item") in the array of records (such as the icon array depicted in FIG. 11) corresponds to one of the computer resources associated with a repositionable graphical representation displayed upon the user interface. The fields of the Desktop items utilized by the display arrange system are summarized in FIG. 12.

Turning to FIG. 12, each Desktop item includes a Name field 170 identifying a file name assigned to a Desktop item. During an arrange operation, the contents of the Name field 170 of a Desktop item are compared to the Name field 80 for a frame specifying a name filter to determine whether the Desktop item may associate with the frame specifying a name filter.

A Class Identification field 172 in a Desktop item identifies an application category to which the Desktop item belongs. During an arrange operation, the contents of the Class Identification field 172 are compared to the Class field 76 for a frame specifying a Class filter to determine whether the Desktop item may associate with the frame specifying the Class filter. The contents of the Class Identification field 172 are also utilized for grouping objects within a same class in a frame when Class grouping is specified in the Group By field 86 of a frame with which the Desktop item is associated. A Type Identification field 174 in a Desktop item identifies a general object type category to which the Desktop item belongs (e.g., Application, Document, Scrap, etc.). During an arrange operation, the contents of the Type Identification field 174 are compared to the Type field 74 for a frame specifying a Type filter to determine whether the Desktop item may associate with the frame specifying the Type filter. The contents of the Type Identification field 174 are also utilized for grouping objects of a same type in a frame when Type grouping is specified in the Group By field 86 of a frame with which the Desktop item is associated.

Each Desktop item may also (optionally) include a Label field 176. During a display arrange operation, the contents of the Label field 176 are compared to the Category field 78 for a frame specifying a Category filter to determine whether the Desktop item may associate with the frame specifying the Category filter.

Fields 170, 172, 174 and 176 described above comprise "intrinsic" desktop item information. In the context of the present invention, intrinsic desktop item information is contained within, or derived from, the contents of the computer resources represented in the array of desktop items. Data representing the present location of a repositionable graphical representation associated with a desktop item (e.g., an icon) is not intrinsic desktop item information since it is derived from the relationship of a desktop item with the graphical user interface rather than the contents of the desktop item.

Each Desktop item includes an ArrangeFrame field 178. The ArrangeFrame field 178 identifies a frame of a currently loaded layout to which the Desktop item is associated for purposes of arranging the moveable graphical representations on the Desktop.

III. Generating New and Editing Existing Layouts

The Layout Editor comprises a portion of the display arrange system which provides a platform for generating new layouts, modifying existing layouts, and saving the new or modified existing layouts. The function and operation of the Layout Editor is described in conjunction with a description of a GUI for the Layout Editor including menus and graphic dialogue boxes which are accessed via a mouse or a keyboard provided to a user.

In the illustrated embodiment of the invention, the Layout Editor is launched from a system menu presented to a user in a known manner. The current layout is loaded for editing when the user launches the Layout Editor. The Layout Editor window (depicted in FIG. 1) thereafter presents various selections to the user via the menu bar 26 comprising a plurality of menus including: File, Edit, Frame, Windows, and Help menus.

Figure 13:
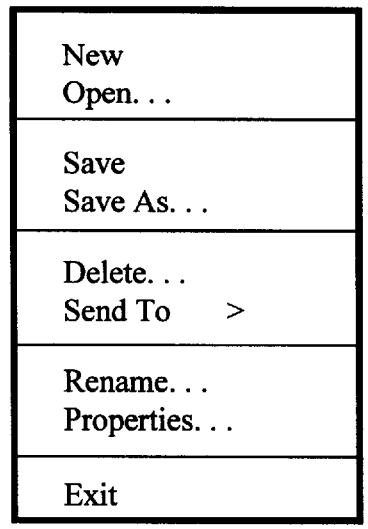
FIG. 13 is a schematic drawing of the selections provided by a File menu when the File entry is selected on a menu bar of the Layout Editor interface.

Turning now to FIG. 13, the menu selections corresponding to the File menu of the menu bar 26 are provided. Selecting a New entry on the File menu causes the display arrange system to create a new layout including a set of default layout properties and frames described above. Alternatively, a user invokes the loading of a previously saved layout by selecting an Open entry on the File menu. After the user selects the Open entry, a dialogue box is presented to the user enabling the user to review a list of previously saved, modifiable layouts, and select one of the layouts for editing.

The File menu of the Layout Editor also provides a Save entry and a Save As entry enabling a user to save a layout. The Save entry and the Save As entry of the File menu enable a user to save a layout under its previous name (if the layout was previously saved) or under a new layout name respectively. Both the Save and Save As commands are known to those of ordinary skill in the art. In order to reduce a user's searching for previously saved layouts, a default directory is specified for storing layouts.

Next, a set of well known File menu entries are provided which enable a user to modify the content of directories, the names of stored files and the locations of stored layouts. A Delete entry of the File menu, when selected, enables a user to delete a layout from a list of presently existing layouts presented in a displayed dialogue box.

A layout is an object that can be shared with other users or systems. A Send To entry, when selected, provides a cascade menu. The cascade menu (not shown) for the Send To entry prompts a user to either send the layout file to a mail destination or to a Desktop. Other possible destinations for a layout object will be known to those skilled in the art.

A Rename entry enables a user to rename a currently loaded layout. An Exit entry enables the user to exit the layout editor. When the user exits the Layout Editor, the Layout Editor prompts the user if changes have been made to the layout file with the query "Do you want to save changes?" The Layout Editor then provides the well known options of yes, no, cancel or help.

A Properties entry of the File menu, when selected, launches a layout properties dialogue box enabling a user to review and, in the case of some layout properties, modify the properties of a selected layout. The fields of the layout properties dialogue box and the values displayed therein represent the current values of the Layout Name, Type, Location, Last Modified, Created, Comments, Disable Animation, Index and When Activated fields of a presently loaded layout. These fields are schematically depicted in FIG. 10 and described above.

The Layout Editor provides, in a known manner, a dialogue box enabling a user to review and modify the contents of the Layout Name field 140, the Comments field 150, the Disable Animation field 152, and the When Activated field 156. The Type field 142, the Location field 144, the Last Modified field 146, the Created field 148 and the Index field 154 are read-only fields in the layout properties dialogue box. The contents of these fields are not directly modifiable by the user. However, these fields provide useful feedback regarding stored layout files and the properties and behavior of each.

Figure 14:
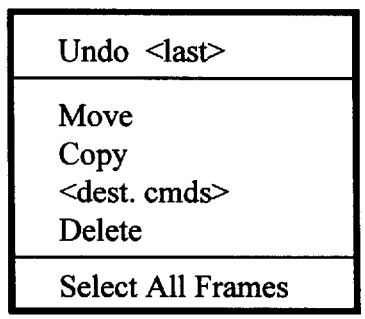
FIG. 14 is a schematic drawing of the selections provided by an Edit menu when the Edit entry is selected on a menu bar of the Layout Editor interface.

Turning now to FIG. 14, the menu selections corresponding to the Edit menu of the menu bar 26 are provided. An Undo entry on the Edit Menu provides a known editing operation enabling a user to reverse the effects of a previous edit or command operation. A Move entry and a Copy entry enable a user to transfer a selected layout file in a known manner to a new location in the available directories of the display arrange system. The default destination of a layout file during Move or Copy operations is a clipboard directory.

The Edit menu also includes a set of destination commands. The destination commands comprise a set of known commands concerning the contents of a clipboard (buffer). Two illustrative examples of destination commands are "copy frame here" and "move frame here" which incorporate well known copy and move commands.

The Edit menu also includes a Delete entry. When a user selects an item (which may be either a frame or an entire layout) and then selects the Delete entry, the Layout Editor removes the selected item from the layout or directory of layouts in a manner known to those skilled in the art. It should be noted however that in the illustrated embodiment of the invention neither the Window frame nor the Desktop frame can be deleted within a layout.

The Edit menu includes a Select All Frames entry. When a user chooses the Select All Entry, the Layout Editor executes the next user initiated command on all frames in a current layout. The Select All entry can invoked in conjunction with the above mentioned Move, Copy, and Delete commands.

Figure 15:
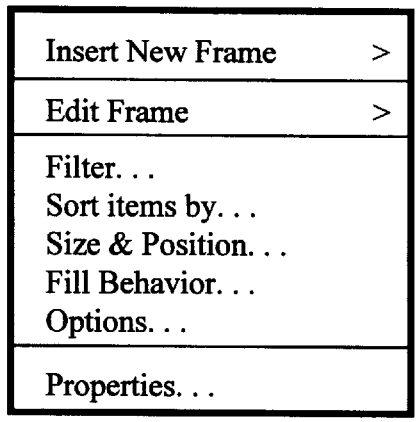
FIG. 15 is a schematic drawing of the selections provided by a Frame menu when the Frame entry is selected on a menu bar of the Layout Editor interface.

In the illustrated embodiment of the present invention, each frame is defined by a set of properties. The properties of a frame are accessed by selecting a frame and then launching a properties dialogue from the Frame menu of the menu bar 26. Turning now to FIG. 15, the menu selections of the Frame menu are provided. An Insert New Frame entry enables a user to define a new icon or minimized window frame. In response to the selection by a user of the Insert New Frame entry, the Layout Editor generates a cascade menu (not shown) from which a user selects either an Icon or a Minimized Window selection. The default field for generating a new frame is an icon frame. In response to a user's selection of a type of frame, the Layout Editor automatically generates a new frame record (See FIG. 2) including a set of default values in the property fields of the frame. Thereafter the Layout Editor provides access to the user for editing the modifiable fields of the default layout. The modifiable fields include the name, filter properties, sorting properties, fill properties, position, size, and automatic behavior. The Layout Editor provides access to these properties for review and modification by the user via the entries of the Frame menu described below.

The Frame menu includes an Edit Frame entry. When a user selects the Edit Frame entry, the Layout Editor displays a cascade menu listing the frames for a current layout. A user thereafter selects one of the listed frames from the list via a mouse controlled pointer or an appropriate keyboard entry in order to load a listed frame for purposes of reviewing and/or editing the modifiable property fields of the selected frame.

Continuing with the description of FIG. 15, the Frame menu includes a number of entries providing user access to modifiable properties of a selected frame. The Frame menu includes a Filter entry. When a user selects the Filter entry, the Layout Editor causes the GUI to display a Filter Properties dialogue box including a plurality of frame filter property fields corresponding to the Frame Filter Properties field 72. The frame filter property fields represented in the filter properties dialogue box are summarized in FIG. 3. The Filter Properties dialogue box presents the current filter properties assigned to a selected frame for review and modification by a user. The current assigned value for each of the filter property fields in the dialogue box is obtained by the Layout Editor by reading the corresponding fields of the Frame Filter Properties field 72 of the selected frame. The user thereafter modifies the current filter values for a selected frame by means of conventional GUI controls such as a mouse controlled pointer and/or a keyboard. The Layout Editor stores the new filter values in the Frame Filter Properties field 72.

The Frame menu includes a Sort Items By entry which, when selected by a user, launches a Sorting Properties dialogue box displaying grouping and sorting property fields corresponding to the Sort Properties field 84 (summarized in FIG. 4). The Sorting Properties dialogue box also provides the current sorting properties assigned to a selected frame for review and modification by a user. The current value for each of the Sort Property fields in the dialogue box is obtained by the Layout Editor by reading the corresponding fields of the Sort Properties field 84 of the selected frame. The user thereafter modifies the current sort values for a selected frame by means of conventional GUI controls. The Layout Editor stores the modified values in the Sort Properties field 84.

The Frame menu includes a Size & Position entry which, when selected by a user, launches a Size and Position properties dialogue box displaying a plurality of fields for a frame corresponding to the Size and Position Properties field 94 (summarized in FIG. 5). The Size and Position properties dialogue box also provides the current size and position values assigned to a selected frame for review and modification by a user. These properties are also generally discernable by the user by observing the layout displayed in the Layout Editor window. The current assigned value for each of the Size and Position property fields of the dialogue box is obtained by the Layout Editor by reading the corresponding fields of the Size and Position Properties field 94 of the selected frame.

The Size and Position properties dialogue box generated by the Layout Editor enables a user to modify the position of a frame within a layout by modifying the contents of the Position Left field 96 and the Position Top field 98 through keyboard entry of new coordinates. Alternatively (referring to FIG. 1) the Layout Editor also provides a central grab bar 45 on the selected frame 44 enabling a user to move the selected frame 44 by moving a mouse controlled pointer over the central grab bar 45, clicking down on a mouse button, dragging the central grab bar (and an outline image of the selected frame 44) to a new position, and releasing the mouse button. The Layout Editor stores the new position values in the Position Left field 96 and Position Top field 98. The Layout Editor restricts the repositioning of a frame in order to enforce a requirement that the perimeters of all frames within a layout must fall within the perimeter of the layout.

The Size and Position properties dialogue box generated by the Layout Editor enables a user to modify the dimensions of all cells within a frame by modifying the contents of the Cell Width field 100 and the Cell Height field 102 through keyboard entry of new dimensions. Alternatively (referring to FIG. 1) the Layout Editor enables a user to modify the cell dimensions for a selected frame 44 by moving a mouse controlled pointer to a border of any cell within the selected frame 44, clicking down on a mouse button, dragging the border in the desired direction, and releasing the mouse button. The Layout Editor stores the new cell size value in either the Cell Width field 100 or the Cell Height field 102 depending upon which border was grabbed and re-sized by the user.

The Size and Position properties dialogue box generated by the Layout Editor enables a user to modify the number of rows and columns of cells within a frame by modifying the contents of the Frame Rows Field 104 and the Frame Columns Field 106 through keyboard entry of new values for the frame size fields. Alternatively (referring to FIG. 1) the Layout Editor enables a user to modify the cell dimensions for a selected frame 44 by moving a mouse controlled pointer to a one of the eight grab bars $b_i$ displayed by the Layout Editor on the perimeter of the selected frame 44, clicking down on a mouse button, dragging the grab bar $b_i$ in the desired direction for increasing or decreasing the number of cells in the selected frame 44, and releasing the mouse button.

The Layout Editor facilitates re-sizing the frame in either one direction or two dimensions depending upon the location of a grab bar $b_i$ selected by a user. If a user selects a grab bar $b_i$ disposed on a side of a frame (e.g., grab bar $b_1$ or $b_2$), then Layout Editor allows re-sizing in only one dimension (rows or columns, but not both). However, if the user selects a corner positioned grab bar (e.g., grab bar $b_3$), then the Layout Editor supports re-sizing in two dimensions (rows and columns). When re-sizing the frame size via one of the grab bars $b_i$, the trip point for incrementing or decrementing to the next frame size is at one-half the cell dimension. The Layout Editor stores updated frame size value(s) in the Frame Rows field 104 and/or the Frame Columns field 106 depending upon the grab bar $b_i$ selected by the user.

When a user selects a Fill Behavior entry on the Frame menu, the Layout Editor launches a Fill Behavior properties dialogue box for a frame displaying a plurality of property fields corresponding to the Fill Behavior Properties field 108 (summarized in FIG. 6) and the Automatic Behavior Properties field 116 (summarized in FIG. 7). The dialogue box also provides the current values assigned for a selected frame for the set of properties represented in the Fill Behavior properties dialogue box. The current assigned value for each of the Fill Behavior and Automatic Behavior property fields in the dialogue box is obtained by the Layout Editor by reading the corresponding fields of the Fill Behavior Properties field 108 and the Automatic Behavior Properties field 116 of the selected frame. The user thereafter modifies the current Fill Behavior or Automatic Behavior values for a selected frame by means of conventional GUI controls. In regard to the values of the Automatic Behavior Properties field 116, it is noted that as illustrated in FIG. 1 the status of the automatic behaviors is persistently displayed on the Layout Editor interface via the Status Bar 42.

When a user selects the Options entry on the Frame menu, the Layout Editor displays a general property page corresponding to the Frame Name field 62, Frame Type field 64, Index field 66, Filtering field 68, and Enabled field 70 for a frame. The general property page also provides the current assigned values for each of these fields in order to facilitate review and, if allowed, modification by a user. The current assigned value for each of the fields in the general property page is obtained by the Layout Editor by reading the corresponding Frame Name field 62, Frame Type field 64, Index field 66, Filtering field 68 and Enabled field 70 of the selected frame. The user thereafter modifies the contents of one of the general property fields (if allowed) for a selected frame by means of conventional GUI controls. It is noted that while the Index field 66 is initially set by the display arrange system, a user may re-assign a new index value to a frame.

When a user selects a Properties entry on the Frame menu, the Layout editor launches a properties dialogue comprising each of the above described property pages launched by selecting the Filter, Sort Items By, Size & Position, Fill Behavior, and Options entries of the Frame menu. The properties menu option is disabled if the Window Frame is the currently selected frame since the above described properties do not apply to window frames.

Figure 16:
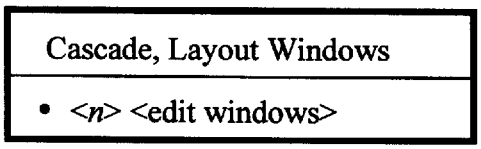
FIG. 16 is a schematic drawing of the selections provided by a Window menu when the Windows entry is selected on a menu bar of the Layout Editor interface.

Turning now to FIG. 16, the selections of the Window menu of the menu bar 26 are provided. The Window menu includes a Cascade, Layout Windows entry. When a user selects the Cascade, Layout Windows entry, the Layout Editor arranges in a cascading manner all of the presently open layout edit windows. The remaining entries comprise a list of open layout edit windows. The Layout Editor indicates the currently selected open layout window by means of a bullet or other suitable highlighting mechanism as would be known to those skilled in the art.

Figure 17:
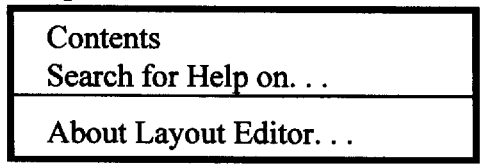
FIG. 17 is a schematic drawing of the selections provided by a Help menu when the Windows entry is selected on a menu bar of the Layout Editor interface.

Turning now to FIG. 17, the selections of the Help menu of the menu bar 26 are provided. When a Contents menu selection on the Help menu is selected, a Table of Contents for help documents is provided. When a Search For Help On menu selection is selected, a user help search interface is invoked for locating help on any topic relating to the display arrange system. An About Layout Editor option provides "version" and copyright information about the layout Editor.

IV. Arranging The Desktop

A. Global Cleanup

The display arrange system executes a Global Cleanup operation on all repositionable desktop items currently displayed upon a graphical user interface in accordance with a currently loaded Layout structure. In the illustrated embodiment of the present invention, the repositionable desktop items include icons and minimized windows. However, the repositionable desktop items rearranged during an arrange operation may be altered in accordance with alternative embodiments of the present invention.

The Global Cleanup operation is initiated by a user by selecting a corresponding menu selection on the Desktop graphical user interface. During the Global Cleanup operation, the display arrange system assigns repositionable desktop items to proper frames in accordance with the above described automatic behaviors, filtering properties, index values and space available within the frames of a current layout. After the repositionable icons or minimized windows are assigned to their respective frame types in a current layout, the display arrange system arranges the contents of the frames in accordance with sorting and arranging properties specified for the frames.

The steps executed by the display arrange system during a Global Cleanup operation are summarized in FIGS. 18–21. However, before describing the steps of the Global Cleanup operation it is noted that frames of a same frame type (i.e., icon or minimized window) are prioritized in order to resolve two types of arrangement conflicts. First, the prioritized list of frames enables the display arrange system to resolve which frame, of two or more overlapped frames of a same type, will be allowed to fill the overlapped region with a repositionable desktop item. Second, the prioritized list of frames enables the display arrange system to resolve which frame will receive a repositionable desktop item when the desktop item meets the filter criteria for more than one frame having available space for displaying the desktop item.

In accordance with the illustrative embodiment of the present invention, after separating and ordering the frames based upon whether their auto-fetch automatic behavior is activated, the display arrange system sorts the frames from highest priority to lowest priority according to the specificity of their filters and secondarily (in the case of ties with respect to the specificity of frame filters) by assigning priority to frames according to the index values associated with the frames.

The above described sorting is accomplished by first sorting the available frames of a given type (i.e., icon or minimized window) according to index value in order to generate a partially sorted set of frames. During sorting by index value, the highest priority is given to the frame having the lowest index value. While index values are used as secondary sort keys for breaking ties arising from the application of the primary sort criterion described below, it will be understood by those of ordinary skill in the art that other suitable tie-breakers can be applied such as the position of a frame upon a graphical user interface.

Next, the partially ordered set of frames (previously sorted by index value) are sorted according to the primary sort criterion, frame filter specificity. Frames having a same level of filter specificity are prioritized according to the frames' index values. The secondary ordering achieved by the previous, index based, sorting operation is maintained by passing from the top to the bottom of the partially ordered list during application of the primary sort criterion.

In accordance with the illustrative embodiment of the present invention, the primary sort criterion resorts the partially sorted set of frames into up to six groups of frames based upon the most specific filter designated by each frame. In the illustrated embodiment of the present invention, full query filtering is considered the most specific filter type. Therefore, the display arrange system passes down the partially sorted list and reassigns highest priority to frames specifying full query (full text search) filtering in the Filtering field 68.

After assigning highest priority to all frames of a same type (icon or minimized window) specifying full query filtering, the display arrange system passes down the remaining frames in the partially sorted list of frames and reassigns next highest priority to frames specifying standard query filtering in the Filtering field 68. Standard query filtering is based upon a search of a designated field or fields in a computer resource represented by a repositionable graphical representation on the graphical user interface. In the illustrated embodiment of the present invention, the set of frames specifying standard query filtering are grouped into four separate levels of specificity according to the contents of the frames' standard query filter fields 74, 76, 78 and 80.

The Name filter is considered the most specific standard query filter. Therefore, the second highest priority for frames (after full query filtering frames) is assigned to frames specifying a filter value in the Name field 80. After frames specifying a name filter, the next (third) highest priority is assigned within the remaining frames to frames specifying a filter value in the Category field 78. After frames specifying a category filter, the next (fourth) highest priority is assigned within the remaining frames to frames specifying a filter value in the Class field 76. The next (fifth) highest priority is assigned within the remaining frames to frames specifying a filter value in the Type field 74. Finally, frames which do not specify full or standard query filtering in the Filtering field 68 are assigned the lowest priority.

Finally, the display arrangement system sorts the list by passing down the partially sorted list and moving frames having the auto-fetch behavior activated to the top of the list (while maintaining the filtering specificity and index value ordering between frames having the same auto-fetch behavior).

It is noted that while an illustrative frame prioritization scheme has been described, other frame prioritization schemes will be contemplated by those of ordinary skill in the art in alternative embodiments of the present invention.

As previously noted, the frames for a layout may overlap. When frames of a same frame type (i.e., icon or minimized window) overlap, the display arrange system validates the overlapping cells of all frames except the frame having the highest priority based upon the above described prioritization scheme for frames of a same frame type (icon or minimized window). After determining the highest priority frame associated with the overlapping region, the other overlapping frames "validate" their overlapped cells by setting appropriate entries in their respective Frame Cell Array 71 to a "filled" state. In an embodiment of the present invention, selective validation of overlapped cells of frames having a same frame type occurs during layout editing when a user saves a layout. However, validating overlapping cells of layout frames may occur at another time such as when a layout is loaded from a stored state.

After a user invokes a Global Cleanup operation, the display arrange system commences arranging a set of displayed repositionable icons and minimized windows in accordance with a layout comprising an ordered set of icon frames (accessed via the Link to Icon Frames 162) and a set of minimized window frames (accessed via the Link to Minimized Window Frames 164). The order of the icon frames is determined by the above described primary and secondary sort criterion. In a first phase of the Global Cleanup operation, the display arrange system arranges the repositionable icons maintained in an icon array (illustrated in FIG. 11). During a second phase, minimized windows may be arranged. After the repositionable icons and minimized windows have been assigned to their positions within the frames defined by the specified layout, the icon plane and window plane are visually re-arranged for a user.

Figure 18:
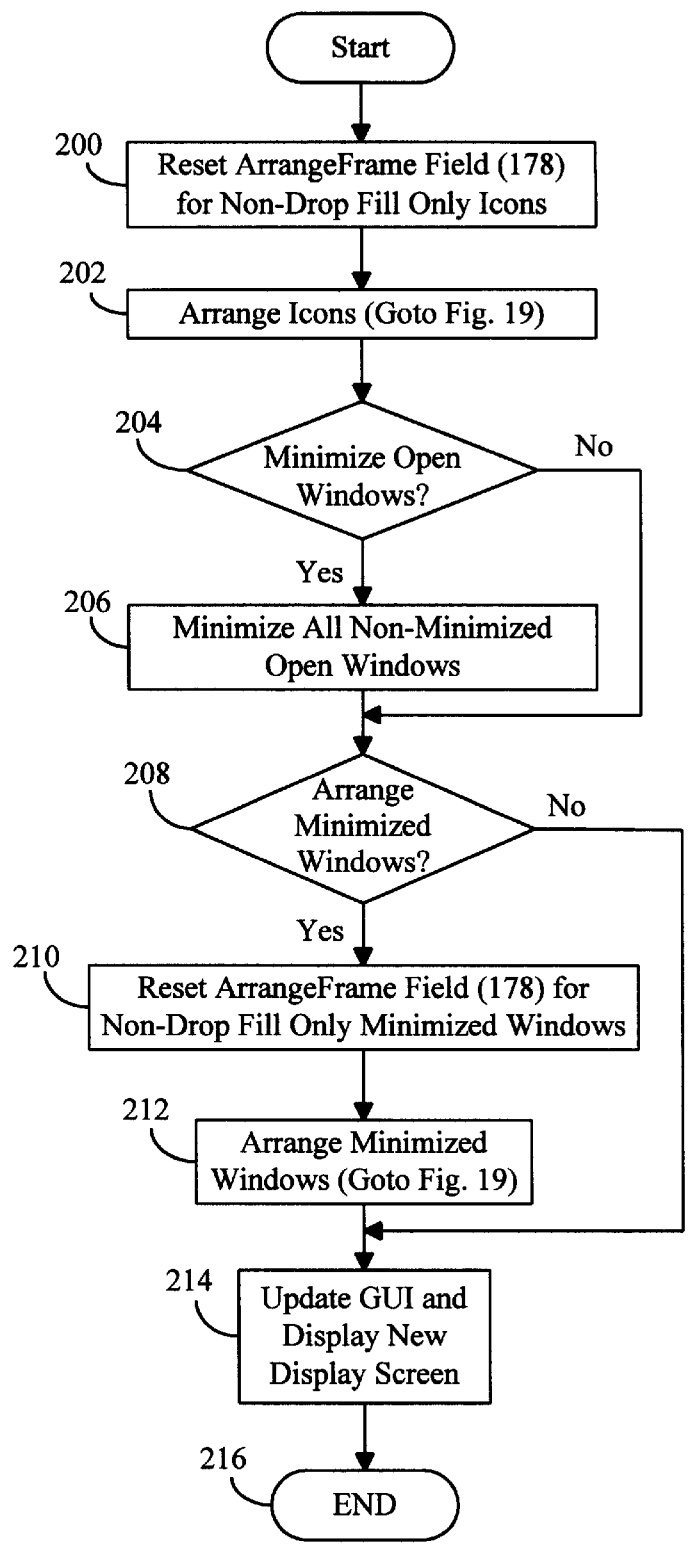
FIG. 18 is a flow chart summarizing the steps for arranging the repositionable desktop items on a GUI in accordance with a selected layout.

Turning now to FIG. 18, when a user invokes the Global Cleanup operation, control passes to step 200 where, in preparation for assigning the repositionable icons identified in the icon array to icon frames, the display arrange system resets the ArrangeFrame field 178 of repositionable icons within the icon array. However, frames with the "drop fill only" automatic behavior activated, and the contents of those frames, are not affected by the Global Cleanup operation. Therefore, during step 200 the ArrangeFrame field 178 is not reset in icons associated with "drop fill only" frames, and the repositionable icons enrolled in "drop fill only" frames will not be repositioned during a Global Cleanup Operation. An icon may be added to, or removed from, a "drop fill only" frame by means of a drag and drop operation on the icon. Whether an icon is enrolled in a "drop fill only" frame is determined by checking the Drop Fill Only field 126 of the frame within which the icon is enrolled. Control then passes to step 202.

Next, at step 202, the display arrange system arranges the repositionable icons according to the steps summarized in FIG. 19 (described below). In general, during step 202, the display arrange system enrolls each icon having a reset ArrangeFrame field 178 (by inserting a frame identification in the ArrangeFrame field 178 for the icon) in the highest priority icon frame capable of receiving a repositionable icon. The enrolled repositionable icons are then placed within their respective frames according to sort and fill properties specified by the frames within which the repositionable icons are enrolled. Control then passes to step 204.

At step 204, if the When Activated field 156 indicates that non-minimized open windows should be minimized during the Global Cleanup operation, then control passes to step 206. At step 206, the display arrange system minimizes all non-minimized open windows. Control then passes to step 208. If, at step 204, the When Activated field 156 indicates that non-minimized open windows should not be minimized, then control passes directly to step 208.

At step 208, if the When Activated field 156 for the layout indicates that minimized windows are not arranged during a Global Cleanup operation, then control passes directly to step 214 (described below). If however, at step 208 the When Activated field 156 indicates that minimized windows are arranged during a Global Cleanup operation, then control passes to step 210 and the display arrange system commences arranging minimized windows based upon a set of minimized window frames included within the layout. This procedure is analogous to the above described repositionable icon arrangement procedure.

At step 210, in preparation for assigning the minimized windows to minimized window frames, the display arrange system resets the ArrangeFrame field 178 of the minimized windows in a manner analogous to the resetting of the ArrangeFrame field 178 of repositionable icons during step 200. The ArrangeFrame field 178 in minimized windows assigned to "drop fill only" minimized window frames are not reset during step 210.

Next, at step 212, the display arrange system arranges the repositionable icons according to the steps summarized in FIG. 19 (described below). During step 212, the display arrange system enrolls each minimized window having a reset ArrangeFrame field 178 (by inserting a frame identification in the ArrangeFrame field 178 for the minimized window) in the highest priority minimized window frame capable of receiving the minimized window. The enrolled minimized windows are then arranged within their respective frames according to sort and fill properties specified by the frames within which the minimized windows are enrolled. Control then passes to step 214.

At step 214, the display arrange system updates the graphical user interface according to the re-arranged positions of the repositionable icons and minimized windows. The graphical user interface ("GUI") comprises a icon image plane and a minimized window image plane. These image planes include the displayed repositionable icons and minimized windows respectively. A higher display precedence is assigned to the repositionable graphical images associated with the minimized window image plane than the repositionable graphical images associated with the icon image plane. Therefore, a minimized window image may obscure an icon image. On the other hand, a repositioned icon cannot obscure a minimized window image.

During step 214 the icon plane and the window plane are updated according to the new positions for the repositionable icons and the minimized windows resulting from the arrangement steps 202 and 212 respectively. The window plane is displayed over the icon plane. Therefore, the icon plane is redrawn within the display memory and then the window plane is redrawn on top of the display image for icon plane. As previously explained above, in cases of overlap, images associated with the window plane cover any overlapping portions of an icon associated with the icon plane.

In the illustrative embodiment of the present invention, rearranging of the icons and minimized windows is visually displayed on the graphical user interface when the Disable Animation field 152 for the layout is reset. If the Disable Animation field 152 is set, then the re-arranged GUI image replaces the non-arranged GUI image when the GUI image is updated during step 214. If, however, the Disable Animation field 152 is set to zero (i.e., reset), then the rearranging of the repositionable icons and minimized windows is visually displayed as a sequence of automatic "drag and drop" operations. After updating the GUI, control passes to an End step 216.

It is noted that while the graphical user interface is redrawn at step 214 after the minimized window and icon image planes have been arranged, in alternative embodiments of the invention the image planes may be redrawn during separate steps. In fact, the re-drawing of the graphical user interface may occur asynchronously with respect to the calculation of an updated, arranged graphical user interface.

Figure 19:
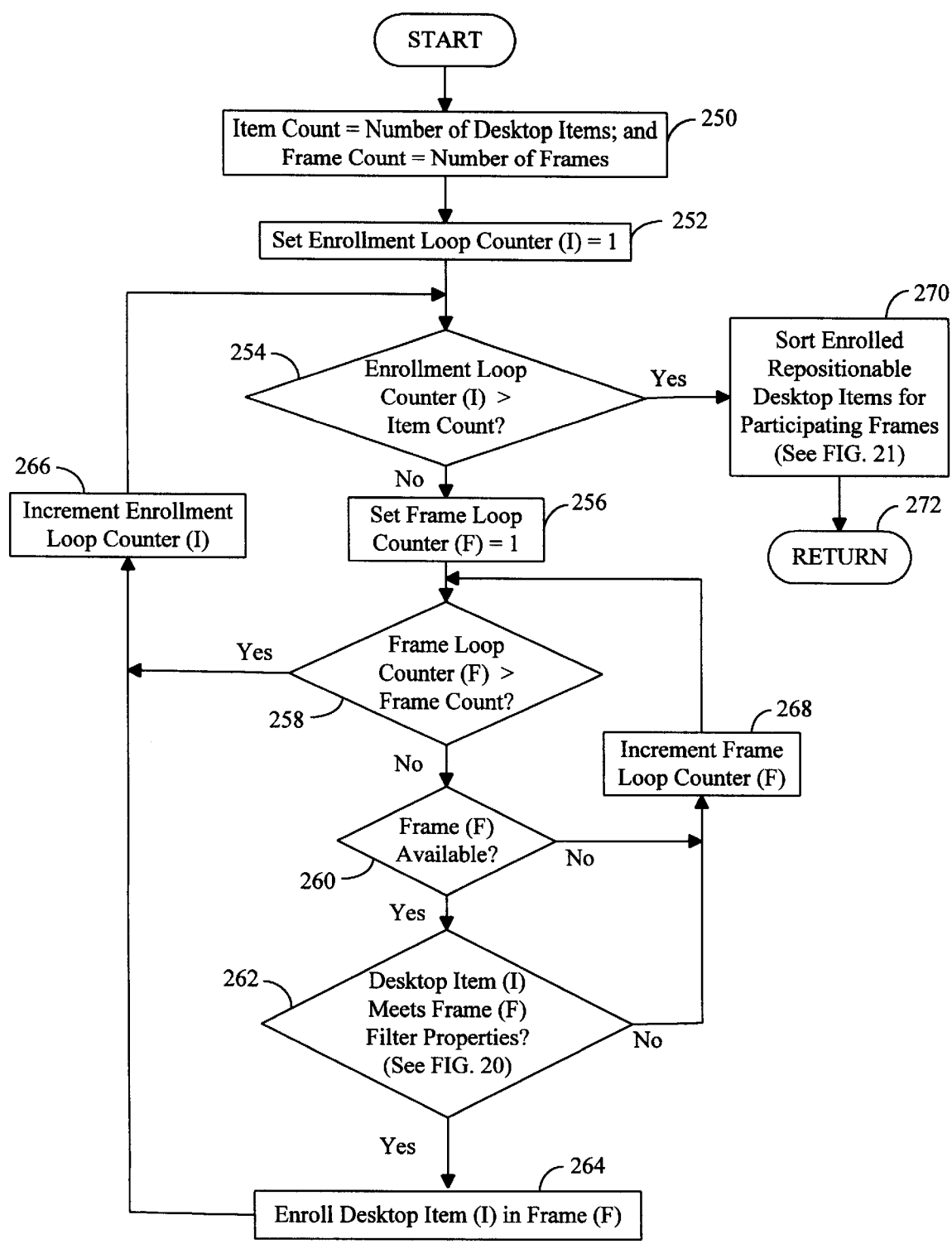
FIG. 19 is a flow chart summarizing the steps for applying frame filters to a set of Desktop items and assigning cell positions to Desktop items within frames.

Turning now to FIG. 19, the steps are summarized for arranging a set of repositionable desktop items associated within a same GUI image plane (i.e., repositionable icon plane or minimized window plane) according to a set of sorted frames for the repositionable desktop items. It is noted that the illustrative procedure for enrolling a set of repositionable desktop items into a set of defined frames uses loop counters, desktop item arrays, and frame arrays. However, in alternative embodiments, the desktop items and frame arrays may be stored in other, appropriate substitute data structures such as linked lists.

Furthermore, it will be appreciated by those of ordinary skill in the art that the desktop items can be assigned to a frame through modifications to the steps summarized in FIG. 19 without departing from the present invention. For example, the enrollment loops may be interchanged so that the inner loop comprises the list of available desktop items, and the outer loop comprises the list of frames.

At step 250 the display arrange system sets an Item Count variable equal to the number of repositionable desktop items which the display arrange system will arrange during the processing of desktop items for an image plane. The desktop arrange system sets a Frame Count variable equal to the number of frames defined in the layout for the image plane. In the illustrative embodiment of the invention, all of the frames for an image plane are considered during the sub-loop beginning at step 258. However, in an alternative embodiment, the set of frames available for consideration is initially restricted to frames which are enabled and do not have an activated "drop fill only" automatic behavior since these frames are the only ones capable of receiving a desktop item during the Global Arrange process.

Next, at step 252 an Enrollment Loop Counter (I) is set equal to one (1). Control then passes to step 254 where the display arrange system begins enrolling desktop items into the frames according to the relative priorities, filter properties, and availability of the frames.

The display arrange system performs a number of iterations of a desktop item assignment loop equal to the Item Count in order to attempt to assign each of the assignable desktop items to a frame. The assignment loop begins at step 254 where the display arrange system determines whether the Enrollment Loop Counter (I) is greater than the Item Count. If the Enrollment Loop Counter (I) is not greater than the Item Count, then the display arrange system has not yet completed attempting to enroll all of the repositionable desktop items associated with the image plane into the frames defined in the layout, and control passes to step 256.

At step 256 the display arrange system sets the Frame Loop Counter (F) equal to one (1), and control passes to step 258 where the display arrange system begins a sub-loop for applying the frames of the layout, based upon priority, to a repositionable desktop item currently indexed via the current value of the Enrollment Loop Counter (I). At step 258, if the Frame Loop Counter (F) is not greater than the Frame Count, then the display arrange system has not yet completed attempting to place the currently unassigned repositionable desktop item indexed by the Enrollment Loop Counter (I) into each of the frames of the image plane of the layout, and control passes to step 260.

At step 260 the display arrange system determines whether the current frame of the layout indexed by the Frame Loop Counter (F) is available to receive a repositionable desktop item. In order to be available, a frame must be enabled and have room in the frame in which to place a repositionable desktop item. Furthermore, the frame must not be a "drop fill only frame." If the frame is available to receive a repositionable desktop item, then control passes to step 262.

At step 262, the display arrange system applies the filter characteristics of the frame indexed by the Frame Loop Counter (F) to the desktop item indexed by the Enrollment Loop Counter (I). The sub-steps associated with the step of applying frame filter properties defined by a currently indexed frame to a currently indexed desktop item are further described in association with FIG. 20. At step 262, the display arrange system determines whether the currently indexed desktop item meets the filter characteristics specified by the currently indexed frame. If the currently indexed desktop item meets the filter characteristics of the indexed frame, then control passes to step 264 and the indexed desktop item is enrolled into the indexed frame by storing the frame identification for the indexed frame in the Arrange Frame field 178 of the indexed desktop item. Control then passes to step 266 wherein the Enrollment Loop Counter (I) is incremented so that the next item of the array of Desktop Items is indexed for purposes of enrollment in one of the frames of the layout. Control returns to the beginning of the enrollment loop at step 254.

If, however, at step 262, the currently indexed desktop item fails to meet the filter properties of the currently indexed frame, then control passes to step 268. At step 268 the display arrange system increments the Frame Loop Counter (F) in order to index the next frame of the prioritized frames, and control returns to step 258, the beginning of the sub-loop for assigning a currently indexed desktop item to a frame.

Returning to step 260, if the display arrange system determines that the currently indexed frame is not available for enrolling any desktop items because the frame is, for example, disabled, lacks sufficient space for displaying the currently indexed desktop item, or is a "drop fill only" frame, then control passes to step 268 without applying any of the filter properties of the indexed frame to the indexed desktop item.

It is possible that no frame will be available in which to enroll a currently indexed desktop item. In such instances, at step 258 the display arrange system detects that the Frame Loop Counter (F) is greater than the Frame Count. Control then passes to step 266 and the display arrange system indexes a next desktop item without enrolling the currently indexed desktop item.

After the display arrange system has attempted to enroll all of the desktop items into the available frames, the display arrange system, at step 254, detects that the Enrollment Loop Counter (I) is greater than the Item Count. Control then passes to step 270, and the display arrange system sorts the desktop items enrolled within frames and fills the frames according to the steps summarized in FIG. 21 (described below). Control then passes to Return step 272.

Figure 20:
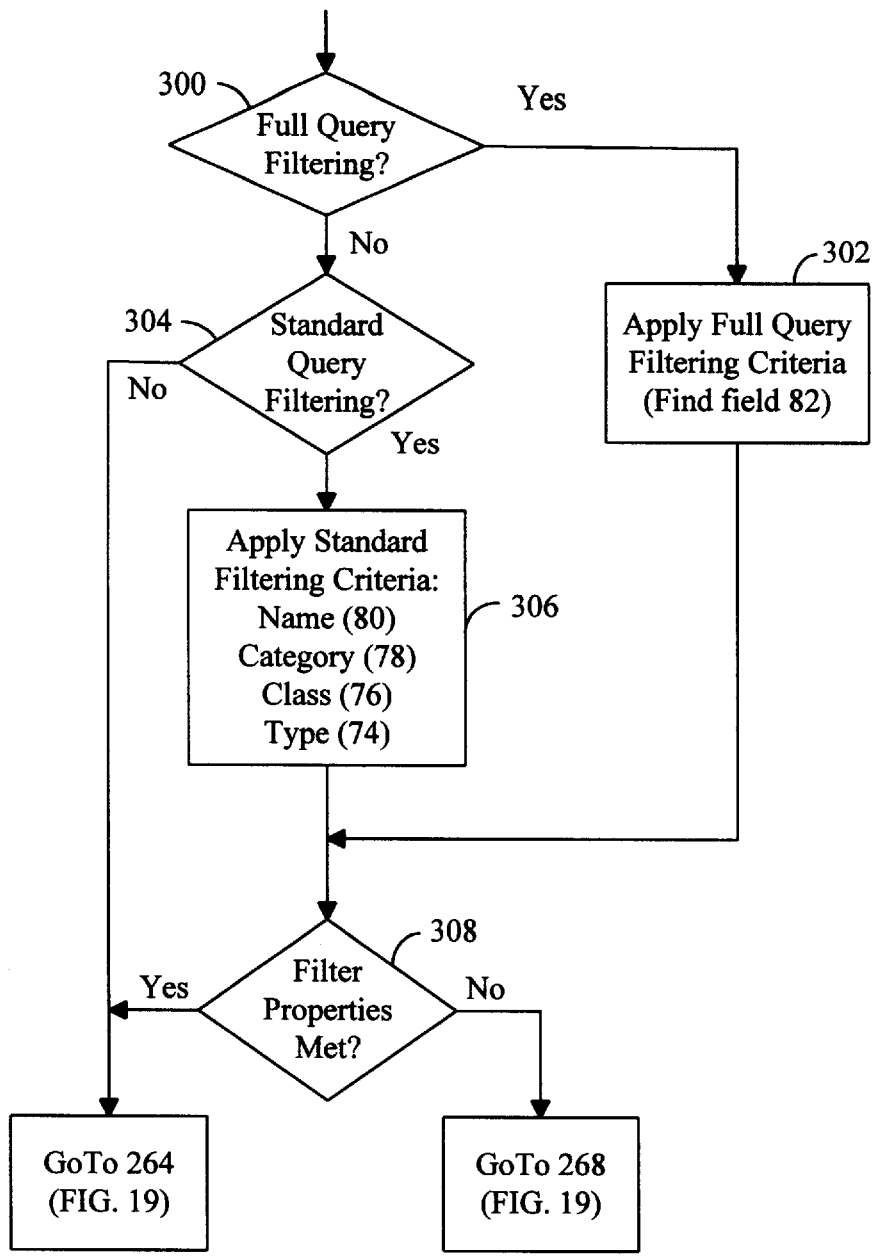
FIG. 20 is a flow chart summarizing the steps for applying frame filtering and arrangement properties to a desktop item.

Having described the general steps for enrolling a set of desktop items in an image plane to a set of frames of a layout associated with the image plane, attention is directed to FIG. 20 which summarizes the steps for applying the frame filter properties for an indexed frame to a currently indexed desktop item. At step 300, in accordance with a preferred embodiment of the invention, the display arrange system determines whether the indexed frame specifies full query filtering. As previously explained above, full query filtering is associated with a "text" based search of the currently indexed desktop item. If full query filtering is specified by the indexed frame, then control passes to step 302. At step 302 the display arrange system performs a text search of the desktop item according to a logical search criterion specified by the full query filter of the indexed frame in order to determine whether the desktop item meets the full query filter specified in the Find field 82 of the indexed frame. The logical search is performed by a well known full text query engine. Control then passes to step 308 (described below).

If, at step 300, full query filtering is not enabled in the currently indexed frame, then control passes to step 304. At step 304 if standard query filtering is enabled via the Filtering field 68, then control passes to step 306 and the display arrange system applies the standard filter properties specified by the Name field 80, the Category field 78, the Class field 76, and the Type field 74 of the indexed frame to the currently accessed desktop item.

It is noted that a frame may specify more than one type of filter, or more than one filter of a same type. If more than one filter type is specified (e.g., a Type filter and a Class filter), then an indexed desktop item must meet one specified filter for each filter type in order to meet the frame's filtering. If a plurality of filters are specified within a same filter type (e.g. Type filter=Document or Scrap), then an indexed desktop item must meet only one (1) of the plurality of filters in order to fulfill that specific filter type. After the display arrange system completes applying the filter properties of the indexed frame to the indexed desktop item, control passes to step 308.

At step 308, the display arrange system determines whether the currently indexed desktop item meets the filter properties of the indexed frame. If the indexed desktop item does not meet the filter properties of the indexed frame, then control passes to step 268 (FIG. 19) and the display arrange system advances the Frame Loop Counter (F). If however, the indexed desktop item meets the filter properties of the indexed frame, then control passes to step 264 and the currently indexed desktop item is enrolled in the currently indexed frame. Returning to step 304, if standard query filtering is not enabled, then the indexed desktop item need not meet any filtering criteria, and control passes to step 264.

Figure 21:
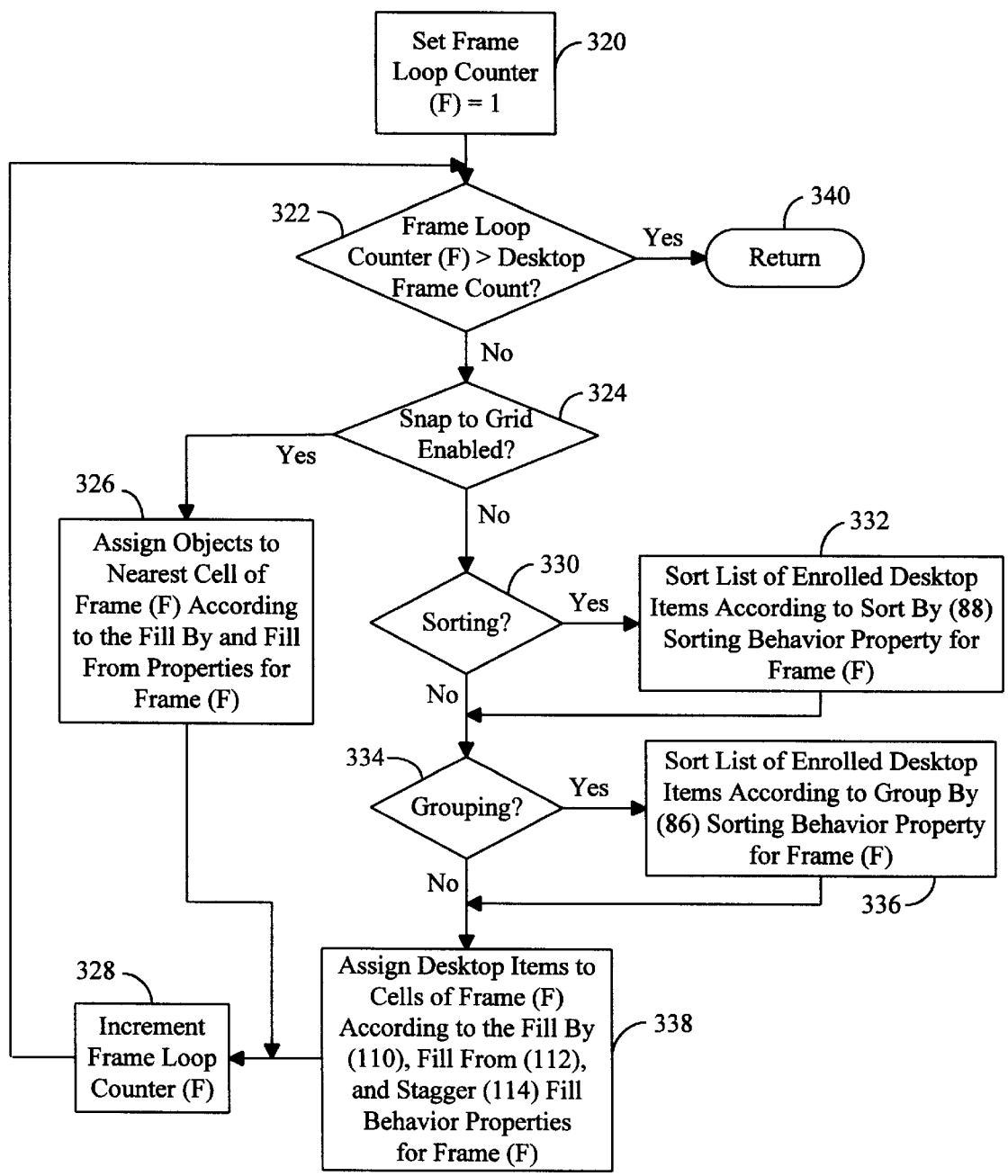
FIG. 21 is a flow chart summarizing the steps for assigning a cell position to a desktop item added to a frame.

Turning now to FIG. 21, the steps are summarized for arranging enrolled desktop items within their respective frames during a Global Cleanup operation. At step 320, the display arrange system sets the Frame Loop Counter (F) equal to one (1). Control next passes to step 322, and the display arrange system determines whether each of the frames in the current image plane of the current layout has been processed in order to arrange the desktop items enrolled within the frames. If the Frame Loop Counter (F) is not greater than the Frame Count (equal to the number of frames contained within the current image plane of the layout), then control passes to step 324.

Snap-to-grid arrangement, when specified by a frame, suppresses all other arrangement properties for the frame. Therefore, at step 324 the display arrange system determines whether the indexed frame specifies snap-to-grid arranging in the Snap-to-Grid field 92. If snap-to-grid arranging is specified by the indexed frame, then control passes to step 326 and the display arrange system assigns the enrolled desktop items to cells within the indexed frame based upon the fill properties specified by the Fill By field 110, the Fill From field 112, and the Stagger field 114 for the indexed frame. If the snap-to-grid property is enabled and a frame cell is the closest frame cell for two or more desktop items enrolled in the frame to which the cell belongs, then the desktop item closest to the center of the cell is assigned to the cell. After the desktop items enrolled within the indexed frame have been assigned to closest open cells within the frame, control passes to step 328 and the Frame Loop Counter is incremented. Control then returns to step 322.

If, at step 324, snap-to-grid arranging is not specified by the indexed frame, then control passes to step 330. At step 330, if the indexed frame specifies sorting in its Sort By field 88, then control passes to step 332. At step 332, the display arrange system sorts the desktop items enrolled in the indexed frame according to a sort key specified in the Sort By field 88. Control then passes to step 334. If no sorting is specified for the indexed frame, then control passes directly from step 330 to step 334.

At step 334, if the indexed frame specifies grouping in its Group By field 86, then control passes to step 336. At step 336, the display arrange system groups the desktop items enrolled in the indexed frame according to a grouping property specified in the Group By field 86. Control then passes to step 338. If no grouping is specified for the indexed frame, then control passes directly from step 334 to step 338.

Next, at step 338, the display arrange system assigns the enrolled (and possibly grouped and/or sorted) desktop items to the cells of the indexed frame according to the fill behavior properties specified by the indexed frame in the Fill By field 110, the Fill From field 112, and the Stagger field 114. After the desktop items are assigned to their cells within the indexed frame, control passes to step 328.

The loop beginning at step 322 is executed by the display arrange system for each frame defined in the current image plane of the layout. After the final frame in the image plane has been processed and control returns to step 322, the Frame Loop Counter (F) is greater than the Frame Count and control passes to Return step 340.

Figure 22A:
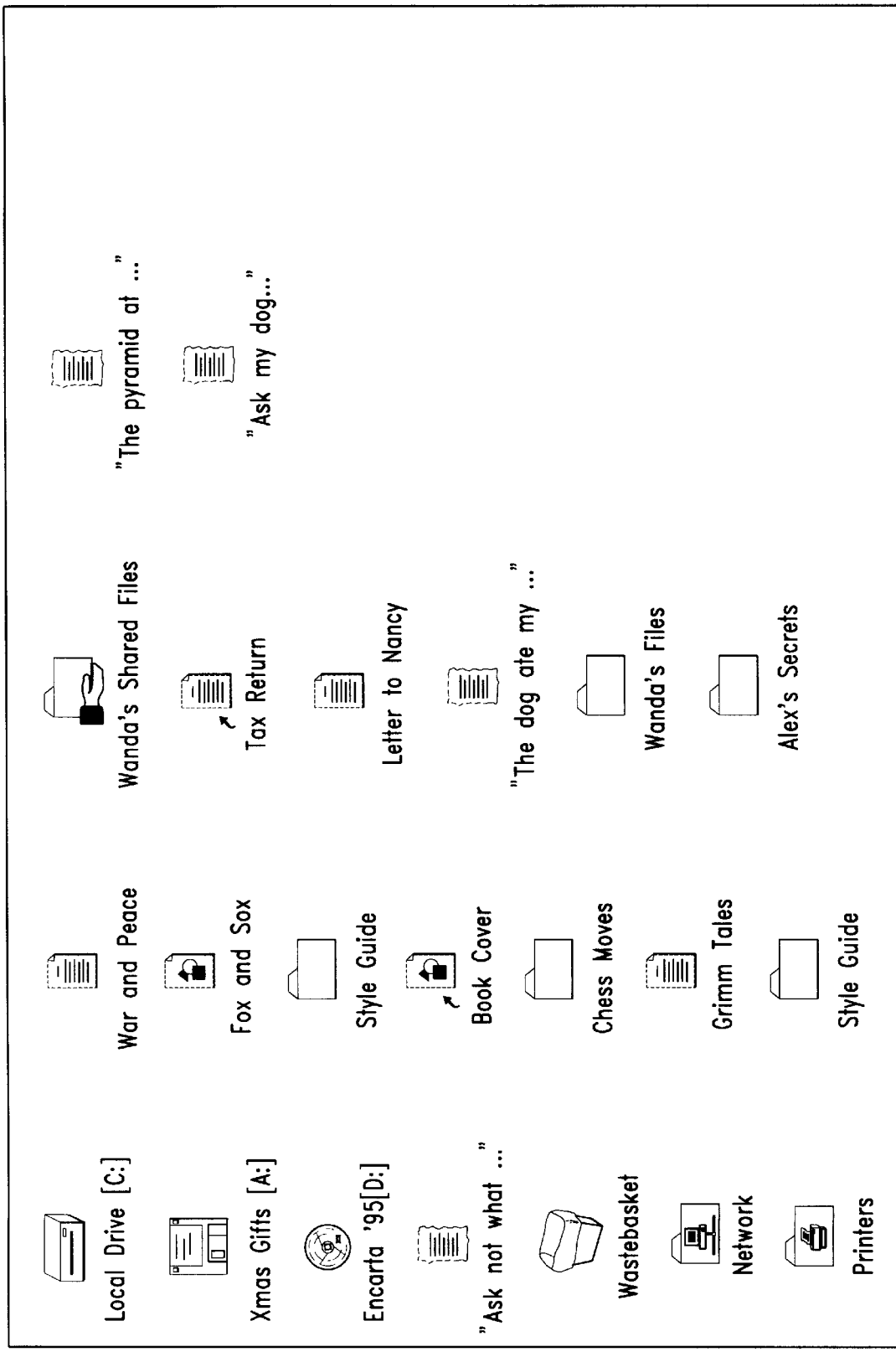
FIG. 22A is a drawing illustrating a desktop interface that is not arranged according to a set of defined frames.
Figure 22B:
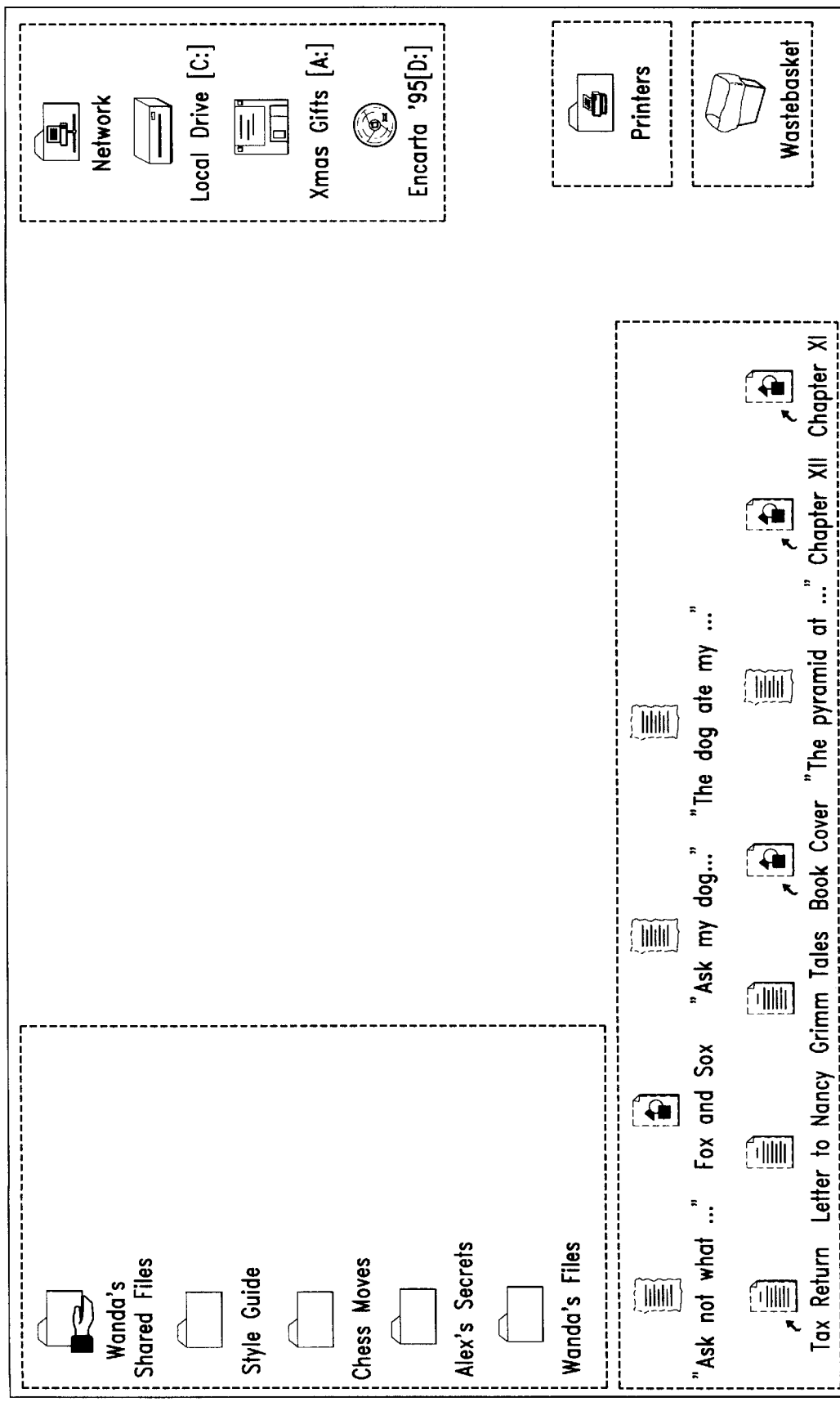
FIG. 22B is a drawing illustrating a desktop interface arranged according to a layout comprising a set of defined frames.

Having described the Global Cleanup operation, attention is directed to FIGS. 22A and 22B which together graphically illustrate the function provided by the display arrange system. FIG. 22A depicts a typical desktop interface comprising a set of heterogenous desktop items. These items, though arranged in rows and columns are not assembled according to defined types, classes, or other grouping criteria.

Turning to FIG. 22B, the same set of desktop items have been arranged according to a defined layout. The layout includes a Folder frame which is associated with the top-left portion of the desktop interface. The layout also includes a Local Drive and Volume frame associated with the top-right portion of the desktop interface. A Printer frame and Wastebasket frame occupy the bottom-right corner of the desktop interface. Finally, a frame defined to accept documents, drawings and scraps occupies substantially the remainder of the bottom portion of the desktop interface. It is noted that the example provided in FIG. 22B of a layout and arranged interface are merely illustrative. One of the benefits provided by the display arrangement system is that a user may define layouts frames, and frame properties in order to accommodate the particular automatic display arrange needs of the user.

B. Placement of Dropped Desktop Items

In view of the automatic frame behaviors described above in conjunction with FIG. 7, the display arrangement system will at times be activated to determine a proper position (other than the dropped location) for a dropped desktop item and execute desktop item arrangement procedures in response to a desktop item being added to a frame on the desktop. In some instances, the display arrangement system will not perform any additional repositioning of desktop items. In other instances, the dropped desktop item is enrolled in a suitable frame. In instances where a repositioned desktop item is enrolled within a frame having an activated auto-arrange automatic frame behavior, the display arrangement system will perform a "local tidying" procedure on the frame in order to arrange the items contained (enrolled) within the frame in accordance with frame-specific arrangement rules for the frame.

Figure 23:
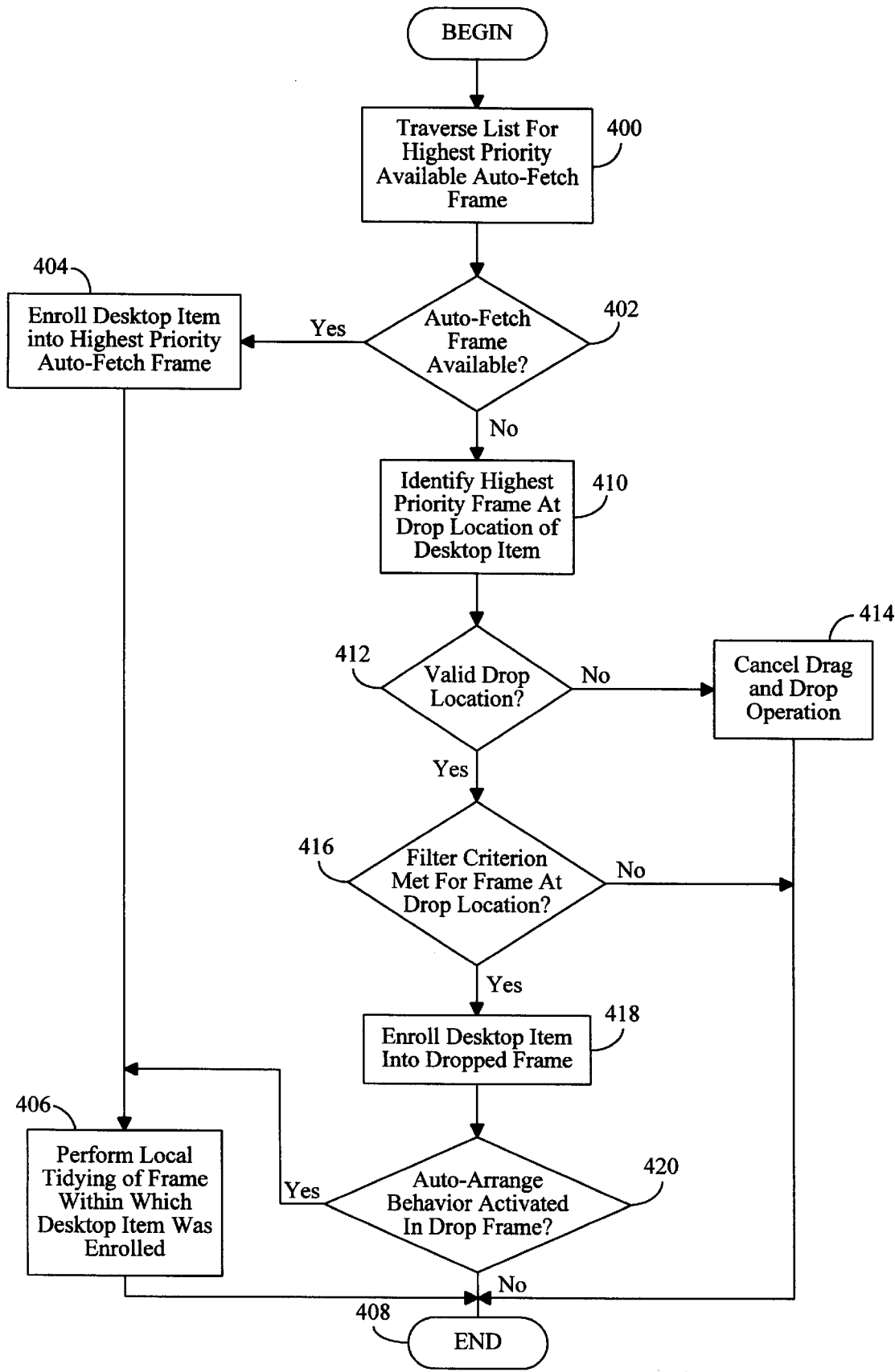
FIG. 23 is a flow chart summarizing the steps for processing a single dropped desktop item by the display arrangement system.

Turning now to FIG. 23, the steps are summarized for performing the above-described automatic enrollment and arrangement procedures arising from a single desktop item being dropped on the Desktop. When a user attempts to drop a desktop item upon the graphical user interface, a message is sent to the display arrangement system identifying the moved desktop item as well as the position and properties associated with the moved desktop item. At step 400, the display arrangement system passes down the sorted, prioritized list of frames in search of a highest priority frame having (1) an activated auto-fetch automatic behavior, (2) proper filtering such that the dropped desktop item meets the frame filter, and (3) available space for displaying the desktop item. The search continues during step 400 until an appropriate auto-fetch frame having an activated auto-fetch automatic behavior is found or there are no more listed frames having an activated auto-fetch automatic behavior. Control then passes to step 402.

At step 402, if an available auto-fetch frame was identified during step 400, then control passes to step 404. At step 404, the display arrangement system enrolls the dropped desktop item into the auto-fetch frame. Enrollment of the desktop item is accomplished by setting the ArrangeFrame field 178 of the desktop item equal to the frame identification for the auto-fetch frame identified during step 400. When the auto-fetch automatic behavior is activated in a frame, the auto-arrange automatic behavior is also activated. Therefore, control then passes to step 406 where the display arrangement system processes the frame according to a "local tidying" procedure described below.

At step 406, the display arrangement system arranges all desktop items that identify the frame into which the dropped desktop item was enrolled in accordance with an operation referred to as "local tidying". During local tidying, the display arrangement system arranges all of the aforementioned enrolled desktop items within the frame according to the frame-specific sorting and filling rules for the frame.

The steps for performing the arrangement operation summarized during step 406 are substantially the same as the steps previously described in FIG. 21 and therefore will not be described here. One exception exists however with respect to the effect of the snap-to-grid arrangement feature. If the snap-to-grid feature is enabled during local tidying, then the desktop items enrolled within the frame are ranked by horizontal and vertical position. Placement of desktop items within frame cells follows the relative positions of the desktop items, rather than absolute proximity of the desktop items to the frame cells as described in FIG. 21. Control then passes to an End step 408.

However, at step 402, if no frame having an activated auto-fetch automatic behavior is available for receiving the desktop item, then control passes to step 410. At step 410, the display arrangement system identifies the highest priority frame at the location on the desktop where the desktop item was dropped. Control then passes to step 412 wherein the display arrangement system determines whether a valid desktop item drop has occurred at the drop location.

At step 412, if a desktop item is dropped at a location on the desktop assigned to a frame having an activated "enforce" automatic frame behavior, then the desktop item must meet the filter properties of the frame in order for a valid drop to occur. Desktop item drops onto frames without the enforce behavior activated are valid even if the dropped desktop item does not meet the filtering criterion of the frame at the drop location. If a valid drop has not occurred, then control passes to step 414 wherein the display arrangement system cancels the drag and drop operation. The cancellation causes the desktop item to be placed at a location on the desktop occupied by the desktop item before the drag and drop operation. Control then passes to the End step 408.

However, at step 412 if the display arrangement system determines that a valid drop has occurred, then the Arrange-Frame field 178 in the dropped desktop item is cleared. Clearing the ArrangeFrame field 178 in the dropped desktop item disassociates the desktop item from a frame within which the desktop item resided. Control then passes to step 416. At step 416, if the display arrangement system determines that the dropped desktop item does not meet the filter criterion specified by the frame at the new drop location, then the desktop item will be displayed at the drop location. However, the ArrangeFrame field 178 in the dropped desktop item is not modified to include the identification of the frame located at the drop location. Instead control passes directly to the End step 408.

However, at step 416 if the display arrangement system determines that the dropped desktop item meets the filter criterion specified by the frame at the new drop location, then control passes to step 418. At step 418, the display arrangement system enrolls the desktop item into the frame in preparation for other frame-specific operations. Next, at step 420 if the frame in which the desktop item was enrolled has its auto-arrange automatic behavior activated, then control passes to step 406 and "local tidying" is performed on the frame within which the dropped desktop item has been enrolled.

However, at step 420 if the auto-arrange behavior is not activated, then no further action is taken by the display arrangement system after the desktop item is enrolled in the frame. Control passes to the End step 408. However, it is noted that the desktop item is now affiliated with the frame within which the desktop item was enrolled during step 418. Therefore, the dropped desktop item will be arranged along with the other constituent desktop items in the frame when the desktop is arranged during a Global Cleanup operation.

C. Automatic Layout Reformation

1. User Interface Dimensions Modified

In accordance with the illustrative embodiment of the invention, the dimensions of the Desktop user interface may be altered after a layout has been defined. Therefore, an adjustment scheme is provided for adjusting the positions of the frames within a defined layout in order to maintain the margins between the frames and their nearest work area border when the dimensions of a work area are altered. The new positions are then loaded into a new temporary layout governing arrange operations on the user interface. The steps for this adjustment scheme are summarized in FIG. 24.

Figures 24, 25:
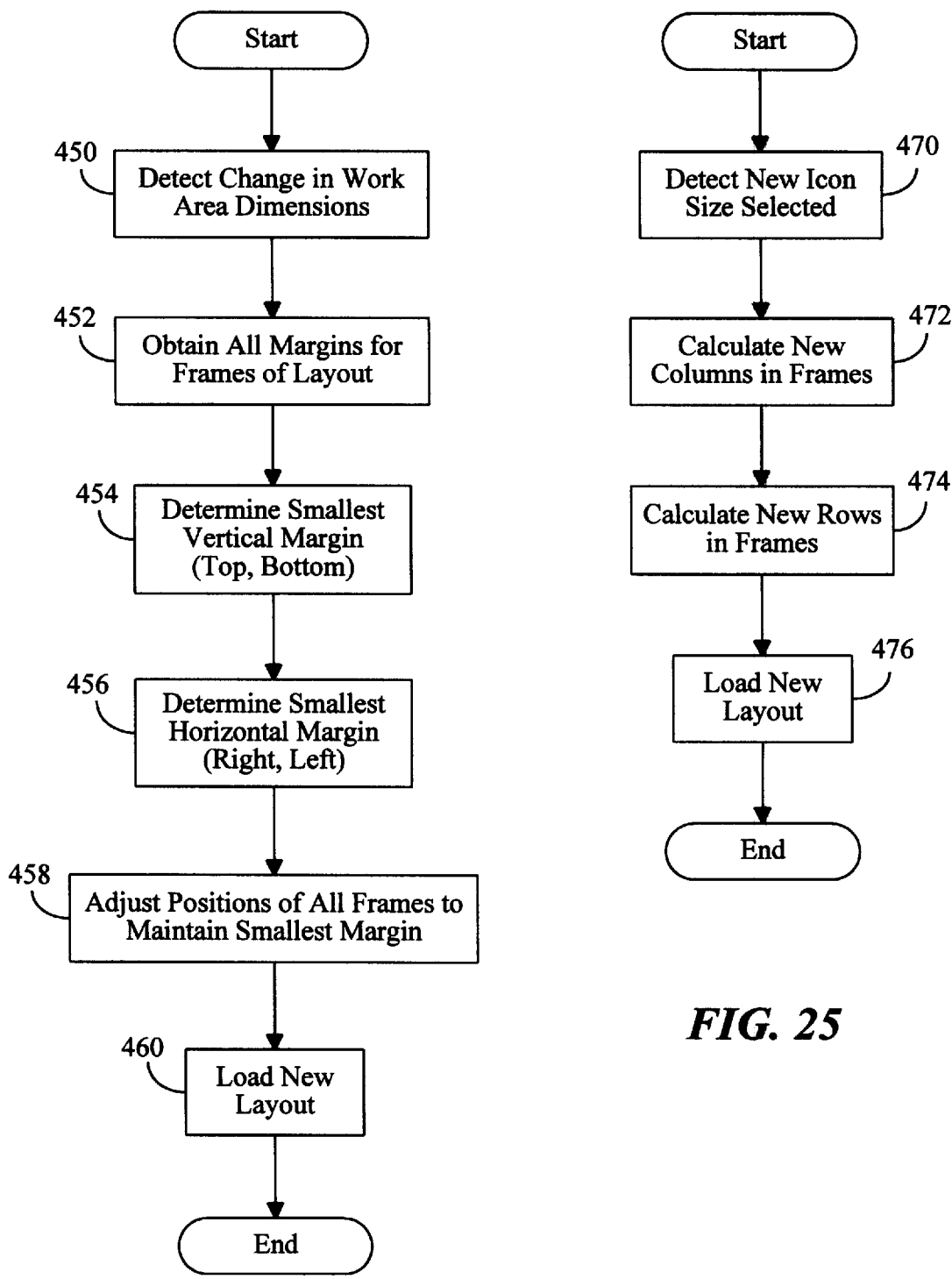
FIG. 24 is a flow chart summarizing the steps for adjusting a layout in response to a change in the dimensions of a work area with which the layout is associated.
FIG. 25 is a flow chart summarizing the steps for adjusting the rows and columns of frames in response to a change in icon size.

Turning to FIG. 24, in response to a detected change in the size of a work area during step 450, control passes to step 452. At step 452 the display arrange system ascertains the margins between borders of the frames of the layout and the work area border that exists prior to the change in the size of the work area.

Next, at step 454 the display arrange system determines the smaller vertical margin (of the top and bottom margins)

for each of the frames of the layout. The smaller vertical margin is the relevant margin for purposes of determining new border positions for the frames in response to a changed vertical dimension of the work area.

Next, at step 456 the display arrange system ascertains the smaller horizontal margin (of the left and right margins) for each of the frames of the layout. The smaller horizontal margin is the relevant margin for purposes of determining new border positions for the frames in response to a changed horizontal dimension of the work area. Control then passes to step 458.

At step 458, the display arrange system modifies the horizontal and/or vertical positions of the frames if necessary in order to restore the relevant margins for the frames which existed prior to the change in the size of the work area. The actual size of each frame is not modified. Finally, a new layout is loaded during step 460. The new layout corresponds to the previously loaded layout. However, the positions of the frames are modified in order to maintain the previously determined relevant margins between the frame borders and the perimeter of the work area.

2. Icon Size Modified

In the known WINDOWS (TM Microsoft Corporation) operating system, icons may be displayed in a normal view or small view. In the illustrative embodiment of the invention, the Desktop user interface with which a layout is associated may be altered after a layout has been defined by modifying the size of the displayed icons. Therefore, an adjustment scheme is provided wherein the display arrange system recalculates the number of rows and columns of cells in each frame based upon the new size of an icon cell. The new dimensions of frames (rows and columns) are thereafter loaded into a new temporary layout used to govern arrange operations on the current user interface. The steps for this adjustment scheme are summarized in FIG. 25.

At step 470 a new icon size selection is detected, and control passes to step 472. At step 472 the display arrange system calculates a new value for the number of columns in each frame by dividing the width of each frame by the width of the new size icon cell. Where a fraction of a cell remains, the display arrange system rounds to the nearest whole cell. The width of the frame is altered accordingly while maintaining the original smallest horizontal margin for each frame (see step 456 described above in conjunction with FIG. 24).

At step 474 the display arrange system calculates a new value for the number of rows in each frame by dividing the height of each frame by the height of the new size icon cell. Where a fraction of a cell remains, the display arrange system rounds to the nearest whole cell. The height of the frame is altered accordingly while maintaining the original smallest vertical margin for each frame (see step 454 described above). Finally, a new layout is loaded during step 476. The new layout corresponds to the previously loaded layout. However, the above described frame row and column adjustments are incorporated into the new layout.

D. Arranging Open Windows In A Window Frame

The Window frame supports arrangement of open windows in three modes. The window arrange operations are facilitated by and executed in accordance with known position and dimensional information associated with each window object. A known "tile" arrangement mode displays all of the open windows as tiles in a two dimensional array within the Window frame perimeter. When displayed in the tile mode, the user may designate either horizontal or vertical tile alignment of the open windows in a known manner. A "cascade" arrangement mode displays the arranged open windows in layered manner, known to those skilled in the art, without arranging the layering of the open windows.

Figure 26:
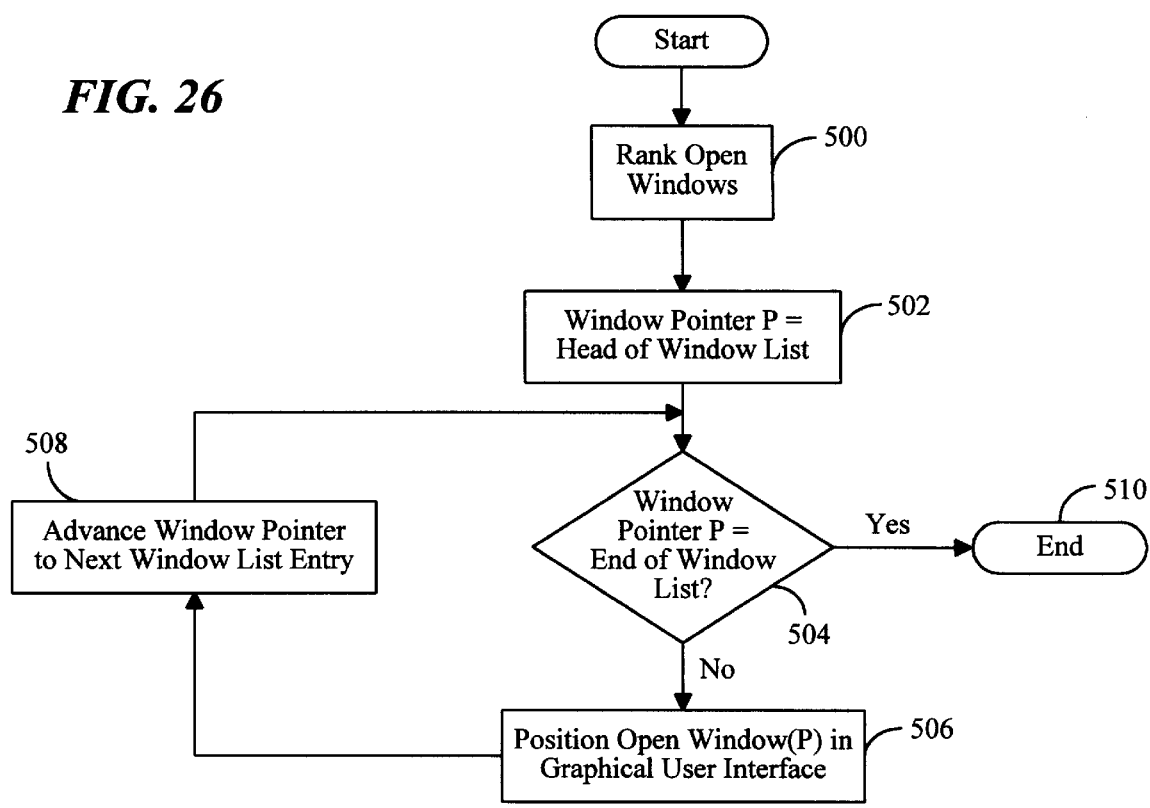
FIG. 26 is a flow chart summarizing the steps for arranging a set of open windows on a GUI.

In a "stack" arrangement mode, the display arrange system arranges the open windows from largest (on the bottom) to smallest (on the top). Turning to FIG. 26, a method for arranging a set of open windows on a GUI is summarized. The display arrange system, when executing a stack arrangement of open windows, at step 500 first establishes a stacking order for the windows. During the step 500, the display arrange system calculates the area of each of "N" open windows and assigns a rank to each open window based upon the area of each open window. A Window Pointer "p" is set to the head of the list of open windows at step 502. At step 504, the "i" is read to determine whether all of the open windows have been processed for the Stack arrange operation by determining whether the Window Pointer is referencing the end of the list of open windows. Next, at step 506, the display arrange system updates the GUI display by repositioning the open window currently referenced by the window pointer p. Control passes to step 508, and the Window Pointer p is advanced to a next position on the list of open windows. If at step 504, the Window Pointer p points to the end of the list, then control passes to the END 510. If at step 504, the Window Pointer P does not point to the end of the list, then control passes to step 506.

After the step 504 has been executed N times so that all of the open windows have been stacked for display upon the GUI, the counter i equals N, therefore when control flows to step 506, the condition is met for passing to the End step 510. Thereafter, an updated GUI display shows the open windows in a stacked manner. Though an illustrated embodiment of a method for stacking open windows from greatest surface area (on bottom) to least surface area (on top) has been described, alternative methods for arranging the windows from greatest to least window area will be readily constructed in view of the above described exemplary method.

V. An Illustrative Computer System Embodying The Invention

Figure 27:
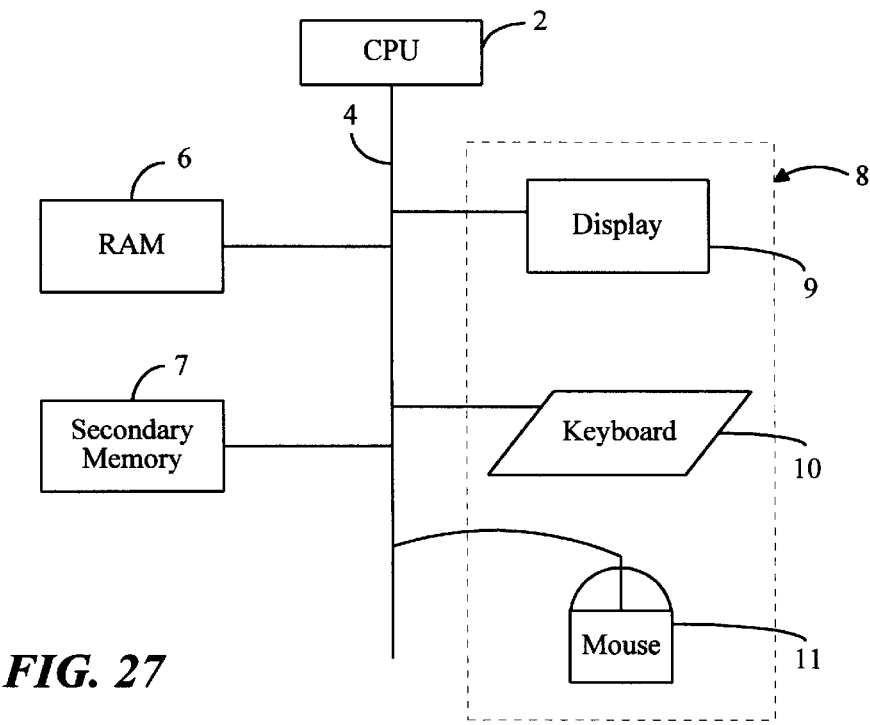
FIG. 27 is a schematic drawing of an illustrative computer system incorporating the present invention.

A computer system for carrying out the schematically illustrated in FIG. 27 comprises a central processing unit (CPU) 2 coupled by means of a bus 4 in a known manner to a random access memory 6. The CPU 2 is also coupled to a non-volatile secondary memory 7 for storing various system and applications routines and programs. The CPU 2 is coupled in known manner to known user interface input/output apparatuses 8 including a display 9. The display 9 may be any of a number of known display devices including, for example, monochrome and color cathode ray tubes and LCD displays. The user interface input/output apparatuses 8 also include a keyboard 10 and mouse 11 to facilitate the submission of instructions to the CPU 2. Though not shown in FIG. 27, the computer system may also include a number of peripheral units as would be known to those skilled in the art. The computer system hardware depicted in FIG. 27 is intended merely to show a representative hardware configuration. It would of course be understood by one of ordinary skill in the art that the present invention encompasses other computer system hardware configurations and is not limited to the computer system hardware configuration described above.

Though an illustrated embodiment of the present display arrange system and method has been described, it would of course be known to one of ordinary skill in the area of user interfaces for computers and operating systems in general to make certain modifications to the described illustrated system and method which would not depart from the scope and spirit of the invention described in the claims appended below.

Such changes entail modifying the set of filter and arrangement fields associated with layout frames, modifying the manner in which the filter and arrangement fields are applied, and modifying the manner in which the above described arrangement operations are invoked.

It would also be known to modify the above disclosed computer system so that it is incorporated within a local area network, or a group of computer work stations sharing a mainframe operating system. The scope of the invention is intended to cover all modifications to the above described display arrange system as would be known to those of ordinary skill in the art of GUI design. Such modifications include incorporation of the arrangement system into user interface containers such as open folders and other GUI elements capable of displaying a set of repositionable graphical display objects. The claimed invention is therefore intended to cover all variations of the illustrated embodiment of the present invention falling within the scope and spirit of the claims appended below.

What is claimed is:

1. A display arrangement system for a computer system having a graphical user interface providing a user convenient access to a set of computer resources associated with repositionable graphical representations displayed by the graphical user interface, the display arrangement system comprising:

an arrangement criterion for positioning the repositionable graphical representations within the graphical user interface based at least upon the contents of the computer resources associated with the repositionable graphical representations wherein the arrangement criterion comprises a window including at least two frames, and wherein each frame comprises an area on the graphical user interface and a set of frame-specific arrangement rules, the set of frame-specific arrangement rules including a frame filtering criterion specifying at least one filtering property for limiting association of computer resources with a frame; and a graphical display arrangement processor for positioning the repositionable graphical representations by applying the arrangement criterion to the set of computer resources wherein the graphical display arrangement processor includes means for applying the at least one filtering property to the computer resources and associating, with the frame, computer resources meeting the frame filtering criterion.

2. The display arrangement system of claim 1 wherein the frame filtering criterion includes a standard query filter criterion identifying at least one group of related computer resources; and wherein the means for applying the at least one filtering property includes means for applying the standard query filter criterion to corresponding fields in the computer resources.

3. The display arrangement system of claim 2 wherein the standard query filter includes a name field specifying a text string; and the means for applying the standard query filter includes means for comparing the text string specified in the name field to text strings within the title field of the computer resources.

4. The display arrangement system of claim 2 wherein the standard query filter includes at least one classification field for identifying a group of computer resources sharing a same classification; and the means for applying the standard query filter includes means for comparing the contents of the at least one classification field to corresponding classification fields in the computer resources.

5. The display arrangement system of claim 1 wherein the frame filtering criterion includes a full query filter criterion comprising at least one text string; and wherein the means for applying the at least one filtering property includes means for performing a text query of the computer resources in order to identify computer resources meeting the full query filter criterion.

6. The display arrangement system of claim 5 wherein the full query filter comprises:

a plurality of text strings; and at least one logical operator.

7. The display arrangement system of claim 1 wherein the graphical display arrangement processor includes means for preventing the placement of a repositionable graphical representation within the area of the graphical user interface specified by the frame if the computer resource corresponding to the repositionable graphical representation does not meet the frame filtering criterion for the frame.

8. The display arrangement system of claim 1 wherein the layout comprises a plurality of frames.

9. The display arrangement system of claim 1 wherein the arrangement criterion further comprises:

a sorting criterion for arranging the repositionable graphical representations relative to other repositionable graphical representations based upon the content of the computer resources to which the repositionable graphical representations correspond; and wherein the graphical display arrangement processor comprises means for sorting the repositionable graphical representations in accordance with the sorting criterion.

10. The display arrangement system of claim 9 wherein the sorting criterion specifies an alphabetical sorting rule.

11. The display arrangement system of claim 9 wherein the sorting criterion further specifies a rule for ordering the repositionable graphical representations.

12. The display arrangement system of claim 1 wherein the arrangement criterion further comprises:

a grouping criterion specifying a manner for grouping repositionable graphical representations having similar corresponding computer resources based upon the content of the corresponding computer resources; and wherein the graphical display arrangement processor comprises means for grouping the repositionable graphical representations in accordance with the grouping criterion.

13. The display arrangement system of claim 1 further comprising:

means for adjusting positions of the at least two frames on the graphical user interface in response to a change in a set of dimensions defining a user interface container within which the at least one frame resides.

14. The display arrangement system of claim 13 wherein the means for adjusting positions includes means for re-assigning a frame position in order to maintain a previous margin between the frame and a border of the user interface container.

15. A display arrangement frame in a graphical user interface for a computer system including a display arrange system for positioning repositionable graphical representations associated with a set of computer resources and displayed by the graphical user interface, the display arrangement frame comprising:

an area on the graphical user interface; and a set of frame-specific arrangement rules, the set of frame-specific arrangement rules comprising:

a set of frame filter properties designating computer resource content characteristics, the frame filter properties being utilized by the display arrangement system to selectively associate computer resources with the frame; and an automatic enforce filter property for preventing the placement of a repositionable graphical representation within the area of the graphical user interface specified by the frame when the automatic enforce filter property is activated, and the corresponding computer resource does not meet the frame filter properties.

16. The display arrangement frame of claim 15 wherein the set of frame-specific arrangement rules further comprises:

a sorting criterion for arranging the repositionable graphical representations relative to other repositionable graphical representations based upon the content of the computer resources to which the repositionable graphical representations correspond.

17. The display arrangement frame of claim 16 wherein the sorting criterion further specifies a rule for ordering the repositionable graphical representations.

18. The display arrangement frame of claim 15 wherein the set of frame-specific arrangement rules further comprises:

a grouping criterion specifying a manner for grouping repositionable graphical representations having similar corresponding computer resources based upon the content of the corresponding computer resources.

19. A method for arranging repositionable graphical representations displayed by a graphical user interface providing a user convenient access to a set of computer resources associated with the repositionable graphical representations, the method for arranging repositionable graphical representations comprising:

designating a positioning criterion for positioning the repositionable graphical representations within the graphical user interface based at least upon the contents of the computer resources associated with the repositionable graphical representations, including defining a window including at least two frames, each frame comprising:

an area on the window; and a set of frame-specific arrangement rules comprising a frame filtering criterion specifying at least one filtering property for limiting association of computer resources with a frame; and determining, by a graphical display arrangement processor, positions for the repositionable graphical representations by applying the frame filtering criterion to the set of computer resources and by associating, with the frame, a computer resource meeting the frame filtering criterion.

20. The method of claim 19 wherein the frame filtering criterion includes a standard query filter criterion identifying at least one group of related computer resources, and wherein the applying the at least one filtering property step includes the step of:

applying the standard query filter criterion to a corresponding field in the computer resource.

21. The method of claim 20 wherein the standard query filter includes a name field specifying a text string, and wherein the applying the standard query filter step includes the step of:

comparing the text string specified in the name field to a text string within the title field of the computer resource.

22. The method of claim 20 wherein the standard query filter includes at least one classification field for identifying a group of computer resources sharing a same classification, and wherein the applying the standard query filter step includes the step of:

comparing the contents of the at least one classification field to a corresponding classification field in the computer resource.

23. The method of claim 19 wherein the frame filtering criterion includes a full query filter criterion comprising at least one text string, and wherein the applying the at least one filtering property step includes the step of:

performing a text query of the computer resource in order to determine whether the computer resource meets the full query filter criterion.

24. The method of claim 23 wherein the full query filter comprises:

a plurality of text strings; and at least one logical connector.

25. The method of claim 19 wherein the determining step further comprises the steps of:

first detecting a dropped repositionable graphical representation within the area of the graphical user interface associated with a frame having an activated automatic enforce filter property; and second determining that a computer resource corresponding to the dropped repositionable graphical representation does not meet the frame filtering criterion for the frame, and in response to the second determining step, preventing the placement of the repositionable graphical representation within the area of the graphical user interface associated with the frame.

26. The method of claim 19 wherein the layout comprises a plurality of frames.

27. The method of claim 19 wherein the arrangement criterion further comprises a sorting criterion for arranging the repositionable graphical representations relative to other repositionable graphical representations based upon the content of the computer resources to which the repositionable graphical representations correspond, and wherein the determining step further comprises the step of:

sorting the repositionable graphical representations in accordance with the sorting criterion.

28. The method of claim 27 wherein the sorting criterion specifies an alphabetical sorting rule.

29. The method of claim 27 wherein the sorting criterion further specifies a rule for ordering the repositionable graphical representations.

30. The method of claim 19 wherein the positioning criterion further comprises a grouping criterion specifying a manner for grouping repositionable graphical representations having similar corresponding computer resources based upon the content of the corresponding computer resources, and the determining step further comprises the step of:

grouping the repositionable graphical representations in accordance with the grouping criterion.

31. The method of claim 19 further comprising the steps of:

detecting a change in a set of dimensions defining a user interface container within which the at least one frame resides, and in response adjusting positions of the at least one frame on the graphical user interface.

32. The method of claim 31 wherein the adjusting positions step includes re-assigning a frame position in order to maintain a previous margin between the frame and a border of the user interface container.

33. A display arrangement system for a computer system having a graphical user interface providing a user convenient access to a set of computer resources associated with repositionable graphical representations displayed by the graphical user interface, the display arrangement system comprising:

an arrangement criterion for positioning the repositionable graphical representations within the graphical user interface based at least upon the contents of the computer resources associated with the repositionable graphical representations, wherein the arrangement criterion comprises a layout including at least one frame, and wherein each frame comprises an area on the graphical user interface and a set of frame-specific arrangement rules, the set of frame-specific arrangement rules including a frame filtering criterion specifying at least one filtering property for limiting association of computer resources with a frame; and a graphical display arrangement processor for positioning the repositionable graphical representations by applying the arrangement criterion to the set of computer resources, wherein the graphical display arrangement processor includes:

means for applying the at least one filtering property to the computer resources and associating, with the frame, computer resources meeting the frame filtering criterion; and means for rearranging a set of repositionable graphical representations associated with the frame in accordance with the set of frame-specific arrangement rules in response to a repositionable graphical representation corresponding to a computer resource meeting the frame filtering criterion being dropped within the area of the graphical user interface specified by the frame.

34. A display arrangement system for a computer system having a graphical user interface providing a user convenient access to a set of computer resources associated with repositionable graphical representations displayed by the graphical user interface, the display arrangement system comprising:

an arrangement criterion for positioning the repositionable graphical representations within the graphical user interface based at least upon the contents of the computer resources associated with the repositionable graphical representations, wherein the arrangement criterion comprises a layout including at least one frame, and wherein each frame comprises an area on the graphical user interface and a set of frame-specific arrangement rules, the set of frame-specific arrangement rules including a frame filtering criterion specifying at least one filtering property for limiting association of computer resources with a frame; and a graphical display arrangement processor for positioning the repositionable graphical representations by applying the arrangement criterion to the set of computer resources, wherein the graphical display arrangement processor includes:

means for applying the at least one filtering property to the computer resources and associating, with the frame, computer resources meeting the frame filtering criterion; and means for associating a repositionable graphical representation with the frame in response to a user dropping a repositionable graphical representation, corresponding to a computer resource meeting the frame filtering criterion, outside the area of the graphical user interface specified by the frame.

35. A display arrangement system for a computer system having a graphical user interface providing a user convenient access to a set of computer resources associated with repositionable graphical representations displayed by the graphical user interface, the display arrangement system comprising:

an arrangement criterion for positioning the repositionable graphical representations within the graphical user interface based at least upon the contents of the computer resources associated with the repositionable graphical representations, wherein the arrangement criterion comprises a layout including at least one frame, and wherein each frame comprises an area on the graphical user interface and a set of frame-specific arrangement rules, the set of frame-specific arrangement rules including a frame filtering criterion specifying at least one filtering property for limiting association of computer resources with a frame; and a graphical display arrangement processor for positioning the repositionable graphical representations by applying the arrangement criterion to the set of computer resources, wherein the graphical display arrangement processor includes:

means for applying the at least one filtering property to the computer resources and associating, with the frame, computer resources meeting the frame filtering criterion; and means for preventing a user from moving a repositionable graphical representation associated with the frame.

36. A display arrangement system for a computer system having a graphical user interface providing a user convenient access to a set of computer resources associated with repositionable graphical representations displayed by the graphical user interface, the display arrangement system comprising:

an arrangement criterion for positioning the repositionable graphical representations within the graphical user interface based at least upon the contents of the computer resources associated with the repositionable graphical representations, wherein the arrangement criterion comprises a layout including at least one frame, and wherein each frame comprises an area on the graphical user interface and a set of frame-specific arrangement rules, the set of frame-specific arrangement rules including a frame filtering criterion specifying at least one filtering property for limiting association of computer resources with a frame; and a graphical display arrangement processor for positioning the repositionable graphical representations by applying the arrangement criterion to the set of computer resources, wherein the graphical display arrangement processor includes:

means for applying the at least one filtering property to the computer resources and associating, with the frame, computer resources meeting the frame filtering criterion; and means for exempting a frame and the computer resources enrolled within the frame from consideration when determining the association of computer resources with the at least one frame of the layout during a global arrangement operation.

37. A display arrangement system for a computer system having a graphical user interface providing a user convenient access to a set of computer resources associated with repositionable graphical representations displayed by the graphical user interface, the display arrangement system comprising:

an arrangement criterion for positioning the repositionable graphical representations within the graphical user interface based at least upon the contents of the computer resources associated with the repositionable graphical representations;

a filling criterion specifying at least one fill behavior property; and a graphical display arrangement processor for positioning the repositionable graphical representations by applying the arrangement criterion and the filling criterion to the set of computer resources.

38. A display arrangement system for a computer system having a graphical user interface providing a user convenient access to a set of computer resources associated with repositionable graphical representations displayed by the graphical user interface, the display arrangement system comprising:

an arrangement criterion for positioning the repositionable graphical representations within the graphical user interface based at least upon the contents of the computer resources associated with the repositionable graphical representations, wherein the arrangement criterion comprises a layout including at least one frame, and wherein each frame comprises an area on the graphical user interface and a set of frame-specific arrangement rules;

a graphical display arrangement processor for positioning the repositionable graphical representations by applying the arrangement criterion to the set of computer resources; and means for redefining row and column dimensions of a frame in response to a change in a default size for icon cells.

39. A display arrangement frame in a graphical user interface for a computer system including a display arrange system for positioning repositionable graphical representations associated with a set of computer resources and displayed by the graphical user interface, the display arrangement frame comprising:

an area on the graphical user interface; and a set of frame-specific arrangement rules, the set of frame-specific arrangement rules comprising:

a set of frame filter properties designating computer resource content characteristics, the frame filter properties being utilized by the display arrangement system to selectively associate computer resources with the frame; and an automatic arrange property for re-arranging a set of repositionable graphical representations associated with the frame in accordance with the set of frame-specific arrangement rules, when the automatic arrange property is activated, in response to a repositionable graphical representation corresponding to a computer resource meeting the frame filter properties being dropped within the area of the graphical user interface specified by the frame.

40. A display arrangement frame in a graphical user interface for a computer system including a display arrange system for positioning repositionable graphical representations associated with a set of computer resources and displayed by the graphical user interface, the display arrangement frame comprising:

an area on the graphical user interface; and a set of frame-specific arrangement rules, the set of frame-specific arrangement rules comprising:

a set of frame filter properties designating computer resource content characteristics, the frame filter properties being utilized by the display arrangement system to selectively associate computer resources with the frame; and an automatic fetch property for associating a repositionable graphical representation with the frame, when the automatic fetch property is activated, in response to a user dropping a repositionable graphical representation, for a computer resource meeting the frame filter properties, outside the area of the graphical user interface specified by the frame.

41. A display arrangement frame in a graphical user interface for a computer system including a display arrange system for positioning repositionable graphical representations associated with a set of computer resources and displayed by the graphical user interface, the display arrangement frame comprising:

a area on the graphical user interface; and a set of frame-specific arrangement rules, the set of frame-specific arrangement rules comprising:

a set of frame filter properties designating computer resource content characteristics, the frame filter properties being utilized by the display arrangement system to selectively associate computer resources with the frame; and locking property for preventing a user from moving a repositionable graphic representation associated with the frame when the locking property is activated.

42. A display arrangement frame in a graphical user interface for a computer system including a display arrange system for positioning repositionable graphical representations associated with a set of computer resources and displayed by the graphical user interface, the display arrangement frame comprising:

an area on the graphical user interface; and a set of frame-specific arrangement rules, the set of frame-specific arrangement rules comprising:

a set of frame filter properties designating computer resource content characteristics, the frame filter properties being utilized by the display arrangement system to selectively associate computer resources with the frame; and a drop fill only automatic property for exempting a frame and the computer resources enrolled within the frame from consideration when determining the association of computer resources with the at least one frame of the layout during a global arrangement operation.

43. A display arrangement frame in a graphical user interface for a computer system including a display arrange system for positioning repositionable graphical representations associated with a set of computer resources and displayed by the graphical user interface, the display arrangement frame comprising:

an area on the graphical user interface; and a set of frame-specific arrangement rules, the set of frame-specific arrangement rules comprising:

a set of frame filter properties designating computer resource content characteristics, the frame filter properties being utilized by the display arrangement system to selectively associate computer resources with the frame; and a filling criterion specifying at least one fill behavior property for assigning positions on the graphical user interface to the repositionable graphical representations in accordance with the filling criterion.

44. A method for arranging repositionable graphical representations displayed by a graphical user interface providing a user convenient access to a set of computer resources associated with the repositionable graphical representations, the method for arranging repositionable graphical representations comprising:

designating a criterion for positioning the repositionable graphical representations within the graphical user interface based at least upon the contents of the computer resources associated with the repositionable graphical representations, including defining a layout including at least one frame, said frame comprising:

an area on the graphical user interface; and a set of frame-specific arrangement rules including a frame filtering criterion specifying at least one filtering property for limiting association of computer resources with a frame; and determining, by a graphical display arrangement processor, positions for the repositionable graphical representations, said determining comprising:

applying the criterion to the set of computer resources;

applying the at least one filtering property to a computer resource and associating, with the frame, a computer resource meeting the frame filtering criterion;

first detecting a dropped repositionable graphical representation within the area of the graphical user interface associated with a frame having an activated automatic arrange property; and second determining that a computer resource corresponding to the dropped repositionable graphical representation meets the frame filtering criterion for the frame, and in response to the second determining step, re-arranging a set of repositionable graphical representations associated with the frame in accordance with the set of frame-specific arrangement rules.

45. A method for arranging repositionable graphical representations displayed by a graphical user interface providing a user convenient access to a set of computer resources associated with the repositionable graphical representations, the method for arranging repositionable graphical representations comprising:

designating a criterion for positioning the repositionable graphical representations within the graphical user interface based at least upon the contents of the computer resources associated with the repositionable graphical representations, wherein designating the criterion comprises defining a layout including at least one frame, and said frame comprising:

an area on the graphical user interface; and a set of frame-specific arrangement rules including a frame filtering criterion specifying at least one filtering property for limiting association of computer resources with a frame;

determining, by a graphical display arrangement processor, positions for the repositionable graphical representations, said determining comprising:

applying the criterion to the set of computer resources;

applying the at least one filtering property to a computer resource and associating, with the frame, a computer resource meeting the frame filtering criterion;

first detecting a dropped repositionable graphical representation of the graphical user interface associated outside the area of the graphical user interface associated with a frame having an activated automatic fetch property; and second determining that a computer resource corresponding to the dropped repositionable graphical representation meets the frame filtering criterion for the frame, and in response to the second determining step, associating the dropped repositionable graphical representation with the frame having an activated automatic fetch property.

46. A method for arranging repositionable graphical representations displayed by a graphical user interface providing a user convenient access to a set of computer resources associated wit the repositionable graphical representations, the method for arranging repositionable graphical representations comprising:

designating a criterion for positioning the repositionable graphical representations within the graphical user interface based at least upon the contents of the computer resources associated with the repositionable graphical representations, wherein designating the criterion comprises defining a layout including at least one frame, said frame comprising:

an area on the graphical user interface; and a set of frame-specific arrangement rules including a frame filtering criterion specifying at least one filtering property for limiting association of computer resources with a frame;

determining, by a graphical display arrangement processor, positions for the repositionable graphical representations, said determining comprising:

applying the criterion to the set of computer resources;

applying the at least one filtering property to a computer resource and associating, with the frame, a computer resource meeting the frame filtering criterion; and first detecting an attempt by a user to move a repositionable graphical representation associated with a frame having an activated locking property, and in response preventing the user from moving the repositionable graphical representation associated with the frame having an activated locking property.

47. A method for arranging repositionable graphical representations displayed by a graphical user interface providing a user convenient access to a set of computer resources associated with the repositionable graphical representations, the method for arranging repositionable graphical representations comprising:

designating a criterion for positioning the repositionable graphical representations within the graphical user interface based at least upon the contents of the computer resources associated with the repositionable graphical representations, wherein designating the criterion comprises defining a layout including at least one frame, said frame comprising:

an area on the graphical user interface; and a set of frame-specific arrangement rules including a frame filtering criterion specifying at least one filtering property for limiting association of computer resources with a frame;

determining, by a graphical display arrangement processor, positions for the repositionable graphical representations, said determining comprising:

applying the criterion to the set of computer resources;

applying the at least one filtering property to a computer resource and associating with the frame, a computer resource meeting the frame filtering criterion; and determining that a frame has an activated drop fill only automatic property, and in response exempting the frame having the activated drop fill only automatic property and the computer resources enrolled within the frame from consideration when selectively associating computer resources with the at least one frame of the layout during a global arrangement operation.

48. A method for arranging repositionable graphical representations displayed by a graphical user interface providing a user convenient access to a set of computer resources associated with the repositionable graphical representations, the method for arranging repositionable graphical representations comprising:

designating an arranging criterion for positioning the repositionable graphical representations within the graphical user interface based at least upon the contents of the computer resources associated with the repositionable graphical representations, the arranging criterion comprising a filling criterion specifying at least one fill behavior property;

determining, by a graphical display arrangement processor, positions for the repositionable graphical representations, said determining comprising:
applying the arranging criterion to the set of computer resources; and
assigning positions on the graphical user interface to the repositionable graphical representations in accordance with the filling criterion.

49. A method for arranging repositionable graphical representations displayed by a graphical user interface providing a user convenient access to a set of computer resources associated with the repositionable graphical representations, the method for arranging repositionable graphical representations comprising:

designating a criterion for positioning the repositionable graphical representations within the graphical user interface based at least upon the contents of the computer resources associated with the repositionable graphical representations, including defining a layout including at least one frame, said frame comprising:
an area on the graphical user interface; and
a set of frame-specific arrangement rules;

determining, by a graphical display arrangement processor, positions for the repositionable graphical representations by applying the criterion to the set of computer resources; and detecting a change in default size of icon cells, and in response re-defining row and column dimensions of a frame.

* * * * *

UNITED STATES PATENT AND TRADEMARK OFFICE
CERTIFICATE OF CORRECTION

PATENT NO. : 5,838,317
DATED : November 17, 1998
INVENTOR(S) : D.A. Bolnick et al.

It is certified that error appears in the above-indentified patent and that said Letters Patent is hereby corrected as shown below:

| COLUMN | LINE | |
|---|---|---|
| 22 | 21 | "resorts" should read --re-sorts-- |
| 39 (Claim 39, | 51-55 lines 10-14) | the paragraph which begins "a set of frame filter properties..." should be double-indented |
| 39 (Claim 39, | 56-64 lines 15-23) | the paragraph which begins "an automatic arrange property..." should be double-indented |

Signed and Sealed this

Eighteenth Day of May, 1999

Attest:

Q. TODD DICKINSON

*Attesting Officer*     *Acting Commissioner of Patents and Trademarks*